(12) United States Patent
Smith

(10) Patent No.: US 7,200,518 B1
(45) Date of Patent: Apr. 3, 2007

(54) METHOD FOR ASSESSING PLANT CAPACITY

(76) Inventor: Jan Bryan Smith, 13676 Greenview Ave., Baton Rouge, LA (US) 70816

( * ) Notice: Subject to any disclaimer, the term of this patent is extended or adjusted under 35 U.S.C. 154(b) by 0 days.

(21) Appl. No.: 11/096,586

(22) Filed: Apr. 1, 2005

Related U.S. Application Data

(60) Division of application No. 10/267,393, filed on Oct. 9, 2002, now Pat. No. 6,876,948, which is a continuation-in-part of application No. 09/999,296, filed on Nov. 15, 2001, now abandoned, which is a continuation-in-part of application No. 09/190,659, filed on Nov. 12, 1998, now Pat. No. 6,334,095.

(51) Int. Cl.
*G06F 19/00* (2006.01)
(52) U.S. Cl. .................................... 702/180
(58) Field of Classification Search ............... 702/180, 702/187
See application file for complete search history.

(56) References Cited

U.S. PATENT DOCUMENTS 5,826,040 A * 10/1998 Fargher et al. ............... 705/8

\* cited by examiner

*Primary Examiner*—Michael Nghiem
*Assistant Examiner*—Tung S. Lau
(74) *Attorney, Agent, or Firm*—Jones, Walker, Waechter, Poitevent, Carrere, & Denegre, L.L.P.

(57) ABSTRACT

A method to determine the capacity of a plant over a time window of interest, the time window having a time length P, having the steps of:
(a) gathering the plant's historical production data over a selected time period of length L and calculating the cycle entries of availability fractions for that data set;
(b) calculating capacity $C(i,1)$ for each contiguous portion $p(i,1)$ of length p of the cycle entries from the previous step;
(c) storing that calculated capacities $C(i,1)$;
(d) randomly shuffling the cycle entries;
(e) calculating the capacity $C(i,2)$ for each contiguous portion $p(i,2)$ of the shuffled cycle entries;
(f) storing the calculated capacities $C(i,2)$; and
(g) repeating steps (e)–(f) for a sufficient number of iterations, and then creating a histogram of the calculated capacities $C(i,j)$.

6 Claims, 20 Drawing Sheets

Figure 1 – Capacity and Availability Assessment Process

Figure 2 – Capacity and Availability Assessment Process (Continued)

Figure 3

Simple Daily Production Data to Illustrate the Concept

| DATE | PRODUCTION | DATE | PRODUCTION |
|---|---|---|---|
| 1-Jan | 900 | 16-Jan | 900 |
| 2-Jan | 910 | 17-Jan | 925 |
| 3-Jan | 905 | 18-Jan | 894 |
| 4-Jan | 890 | 19-Jan | 650 |
| 5-Jan | 700 | 20-Jan | 450 |
| 6-Jan | 700 | 21-Jan | 885 |
| 7-Jan | 901 | 22-Jan | 925 |
| 8-Jan | 925 | 23-Jan | 915 |
| 9-Jan | 915 | 24-Jan | 903 |
| 10-Jan | 910 | 25-Jan | 895 |
| 11-Jan | 895 | 26-Jan | 840 |
| 12-Jan | 0 | 27-Jan | 925 |
| 13-Jan | 600 | 28-Jan | 0 |
| 14-Jan | 888 | 29-Jan | 901 |
| 15-Jan | 915 | 30-Jan | 903 |
|  |  | 31-Jan | 925 |

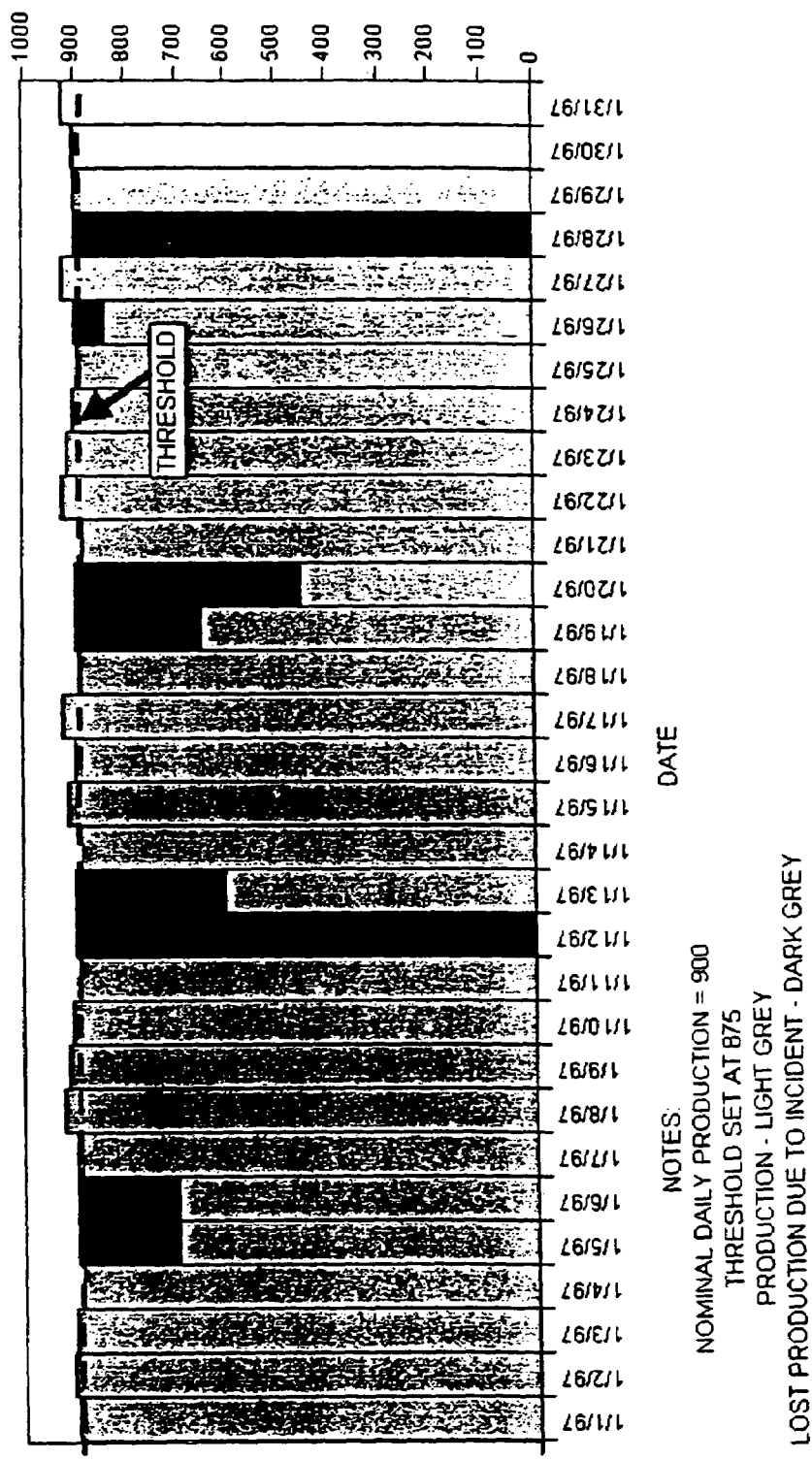

Figure 5

Analysis of Figure 3 Daily Production Data

| DATE (note 1) | TBF (note 2) | TTR (note 3) | CYCLE TIME (note 4) | GOAL (PERIOD MEAN) (note 5) | CUMULATIVE TBF | CUMULATIVE MEAN TBF (note 6) | ELAPSED TIME (note 7) | CUMULATIVE DIFFERENCE (note 8) |
|---|---|---|---|---|---|---|---|---|
| 12/31 | 0 | 0 | | | | | | 0 |
| 1/5 | 5.555555556 | 0.444444444 | 6 | 0.883154122 | 5.555555556 | 5.298924731 | 6 | 0.256630824 |
| 1/12 | 5.666666667 | 1.333333333 | 7 | 0.883154122 | 11.22222222 | 11.48100358 | 13 | -0.258781362 |
| 1/19 | 6.222222222 | 0.777777778 | 7 | 0.883154122 | 17.44444444 | 17.66308244 | 20 | -0.218637993 |
| 1/26 | 5.933333333 | 0.066666667 | 6 | 0.883154122 | 23.37777778 | 22.96200717 | 26 | 0.415770609 |
| 1/28 | 1 | 1 | 2 | 0.883154122 | 24.37777778 | 24.72831541 | 28 | -0.350537634 |
| 1/31 | 3 | 0 | 3 | 0.883154122 | 27.37777778 | 27.37777778 | 31 | 0 |
| TOTALS | 27.37777778 | 3.622222222 | | | | | | |

Notes:

1. Date – Date at which a production incident was first reflected as a production reduction. A production incident is incurred when production falls below an established threshold.
2. TBF – Time Between Failure (production incident). Obtained from cycle time = TBF + TTR. Therefore, TBF = cycle time - TTR
3. TTR – Time to Restore or recover from a production loss due to a failure incident, converted to equivalent days by dividing the production loss by the nominal daily production at the time of the failure incident. An example follows for the TTR determination for Figure 3 production loss on January 5th and 6th.
   Loss = (Nominal Daily Production – Actual Production) / Nominal Daily Production
   For 1/5: (900-700) / 900 = 0.222 days outage
   For 1/6: (900-700) / 900 = 0.222 days outage
   Total TTR for this outage = 0.222 + 0.222 = 0.444 days
4. Cycle Time – The time from the end of one production incident to the end of the next production incident. The end of a production incident is the time at which desired production is achieved. Therefore, cycle time = TBF + TTR
5. Goal (Period mean) – The final cumulative TBF divided by the final elapsed time. Used to develop cumulative difference trend plot. It is analogous to the goal or target in a conventional cumulative sum chart.
6. Cumulative Mean TBF – The current elapsed time multiplied by the goal (period mean). Used to develop cumulative difference trend plot. No special significance otherwise.
7. Elapsed time – Cumulative cycle time used to develop cumulative difference trend plot. No special significance otherwise.
8. Cumulative difference – The cumulative TBF minus cumulative mean TBF. Used to develop cumulative difference trend plot. No special significance otherwise.

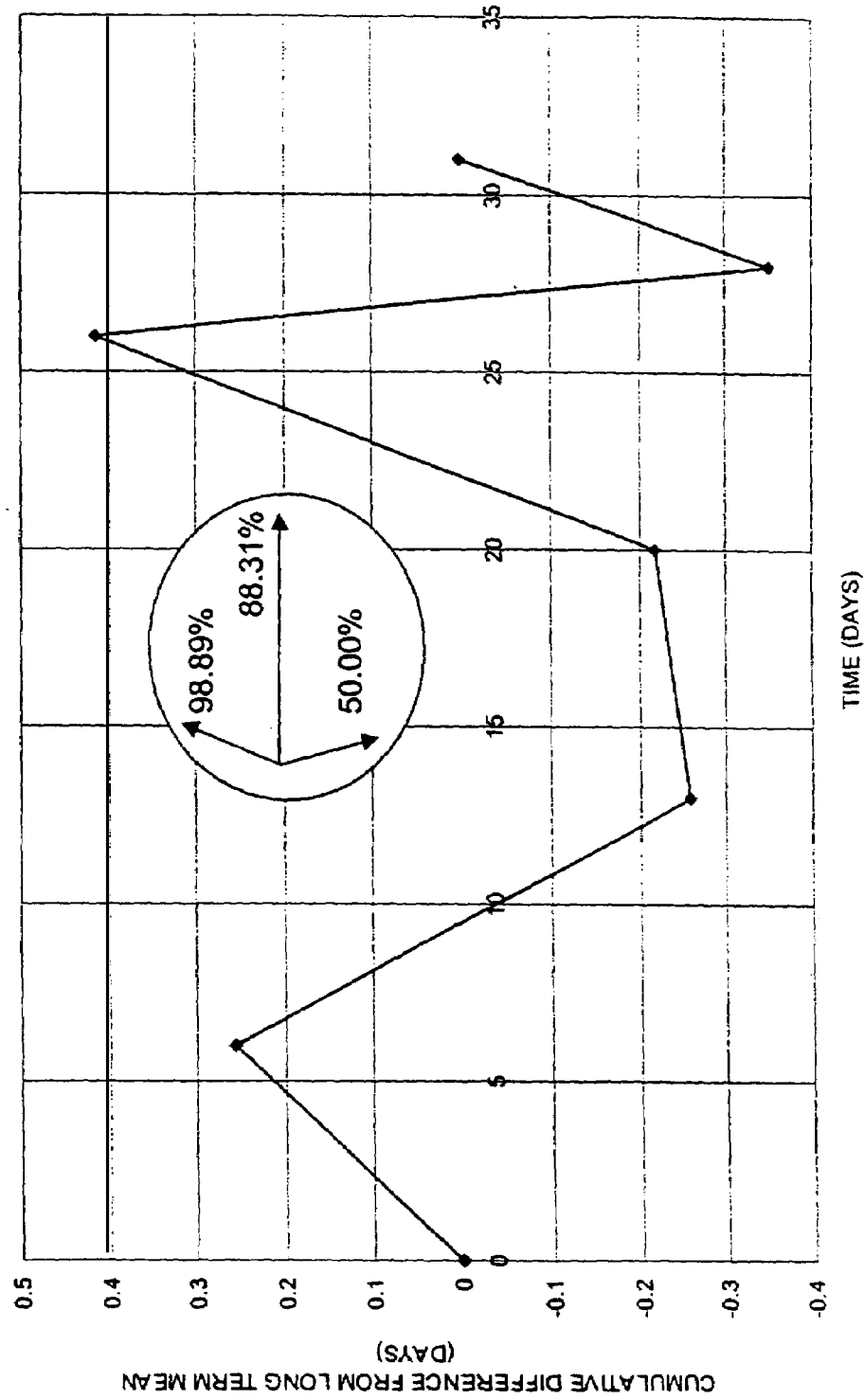

Conceptual representation of the process for determining emperical probability distributions for the failure data of Figure 5

Petrochemical Plant Capacity Distribution
For A 1 Year Period with 7.3 Years of Data
9880 Data Points Failure Information from Production Data.
Time-to-restore shown as both a single number and a data set.

Production Data Reconstructed from Single-valued Time-to-Restore Information. TTR shown as both a single number and a data set.

Obtaining Values of the Availability Random Variable by advancing a time window along the time line General application of the availability fraction for each minimum time interval of interest Availability for 7 Day Period

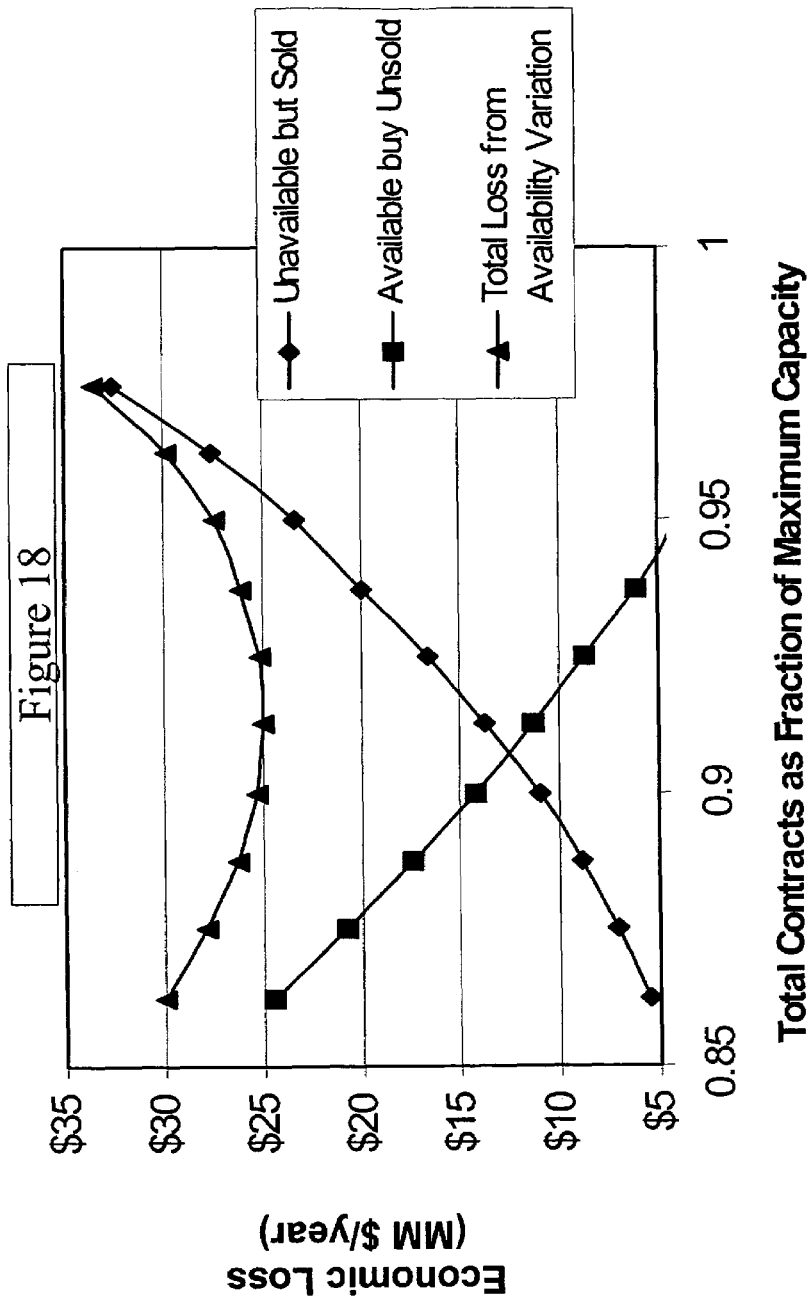

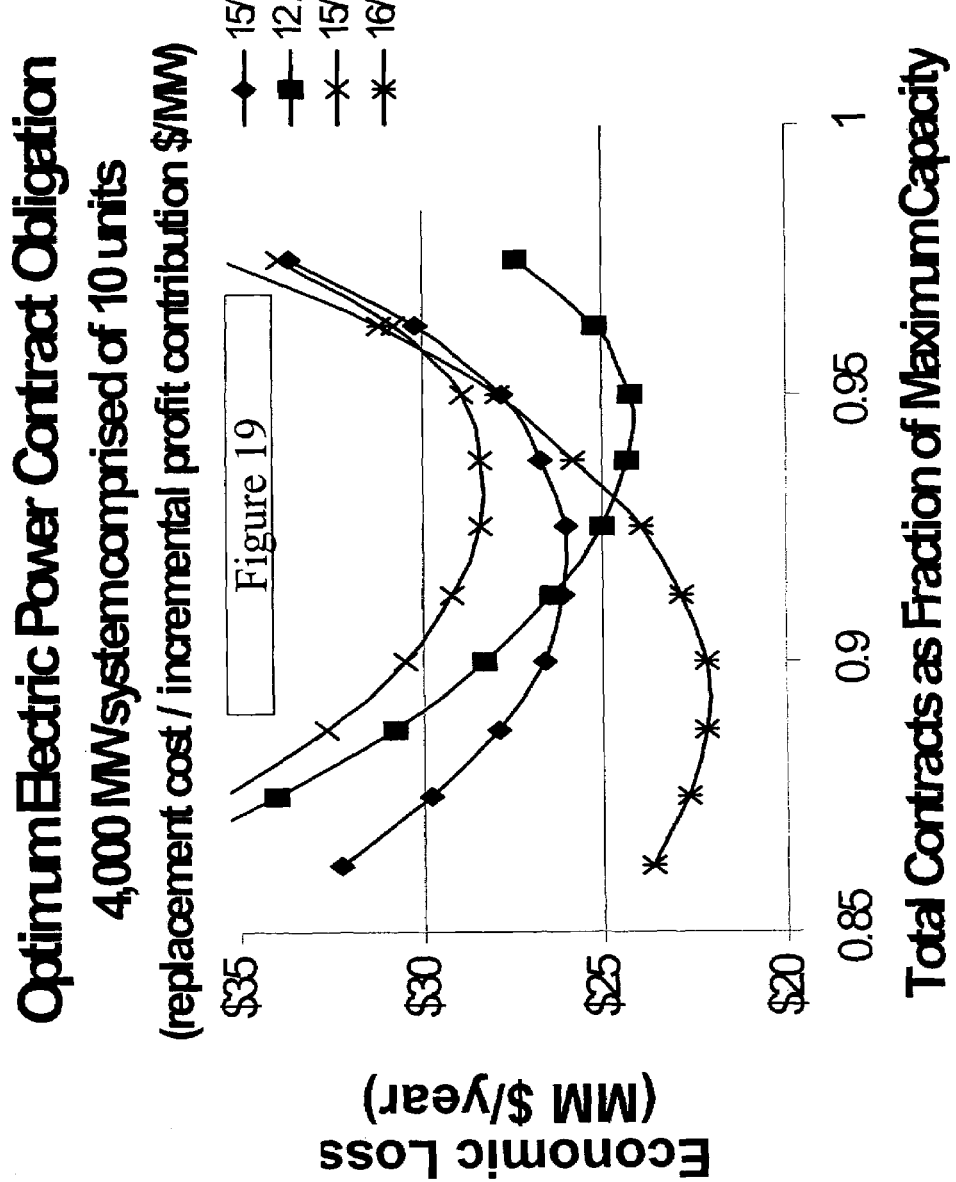

FIGURE 20 – Table A

Probability Density for All Values target or goal = 3 mean = expected value $(EV) = \Sigma vP(v) = 1\left(\frac{1}{6}\right) + 2\left(\frac{1}{6}\right) + 3\left(\frac{1}{6}\right) + 4\left(\frac{1}{6}\right) + 5\left(\frac{1}{6}\right) + 6\left(\frac{1}{6}\right) = 3.5$

| Below Target Assessment | At or Above Target Assessment |
|---|---|
| Probability v < 3: $P(v<3) = \frac{1}{6} + \frac{1}{6} = \frac{1}{3}$ | Probability v ≥ 3: $P(v \geq 3) = \frac{1}{6} + \frac{1}{6} + \frac{1}{6} + \frac{1}{6} = \frac{2}{3}$ |
| Probability Density for Values < 3, mean = 1.5 | Probability Density for Values ≥ 3, mean = 4.5 |
| Mean < 3: $EV(v<3) = 1\left(\frac{1}{2}\right) + 2\left(\frac{1}{2}\right) = 1.5$ | Mean ≥ 3: $EV(v \geq 3) = 3\left(\frac{1}{4}\right) + 4\left(\frac{1}{4}\right) + 5\left(\frac{1}{4}\right) + 6\left(\frac{1}{4}\right) = 4.5$ |
| Mean shortfall, given < 3: $EV(v<3) - \text{target} = 1.5 - 3 = -1.5$ | Mean overage, given ≥ 3: $EV(v \geq 3) - \text{target} = 4.5 - 3 = 1.5$ |
| Mean shortfall: $[EV(v<3) - \text{target}]P(v<3) = (-1.5)\frac{1}{3} = -0.5$ | Mean overage: $[EV(v \geq 3) - \text{target}]P(v \geq 3) = (1.5)\frac{2}{3} = 1.0$ |

METHOD FOR ASSESSING PLANT CAPACITY

CROSS-REFERENCE TO RELATED APPLICATIONS

This application is a divisional of U.S. application Ser. No. 10/267,393 filed on Oct. 9, 2002 now U.S. Pat. No. 6,876,948, which was a continuation-in-part of application Ser. No. 09/999,296, filed on Nov. 15, 2001 now abandoned, which application is a continuation of application Ser. No. 09/190,659 filed on Nov. 12, 1998 now U.S. Pat. No. 6,344,095, all of which this application claims priority and is incorporated herein by reference.

STATEMENT REGARDING FEDERALLY SPONSORED RESEARCH OR DEVELOPMENT

Not applicable

THE NAMES OF THE PARTIES TO A JOINT RESEARCH AGREEMENT not applicable

INCORPORATION BY REFERENCE OF MATERIAL SUBMITTED ON A COMPACT DISK not applicable

BACKGROUND OF THE INVENTION (1) Field of Invention

This invention relates to methods for determining plant capacity, and in particular, to probabilistic methods to evaluate a plant's capacity.

(2) Description of Related Art

Manufacturing plants have operational interruptions due to equipment failure and process and operating problems, which reduce production rates below that which is desired. Measurement of the negative impact that these problems have had on the production capability of the plant is important as a performance indicator and as a guide for production planning in the future. These interruptions to production continuity are functional failures. Some functional failures do not cause a total cessation of production, but only a reduction in manufacturing rate. These reductions in rate may be ignored in the measurement of plant availability in some manufacturing facilities but appropriately are converted to equivalent downtime by many plants. For example, operation at 50% of capacity for two days because of an operational problem is the equivalent of one day of complete downtime.

The maximum possible operating time is determined from the total time within a time period of interest, for example 8760 hours per year. Market-dictated downtime due to lack of sales or any other similar administrative downtime reduces the maximum operating time.

The ratio of total plant downtime to total time, as adjusted in the preceding paragraph, is a measure of plant unavailability. Its complement is plant availability. Plant availability is a common performance measure for a plant. Thus defined, plant availability is never greater than 100% and a reasonable range is 60% to 98%, for a range of industries. Downtime reduces the productivity of a manufacturing facility because reduced production may result in loss of sales and profits. Maintenance and Reliability Engineering organizations in plants have primary goals of optimizing downtime to economical levels to avoid production shortfalls and profit loss.

Plant reliability engineers and others involved in plant reliability have adopted the term "availability" from classical reliability engineering definitions. "Availability" is derived, in classical reliability, from "reliability" and "maintainability." For repairable systems like plants, reliability is measured with Mean Time Between Failure (MTBF) and maintainability with Mean Time to Restore (MTTR). Availability is then defined as:

$$\text{Availability} = MTBF/(MTBF+MTTR)$$

This is identical to the ratio of uptime to total time, or actual production to maximum possible production. However one makes the calculation, the term availability is commonly used. Availability translates into plant capacity, i.e. 95% plant availability means the plant is capable of producing 95% of maximum capacity if called upon to do so. Because of the traditional definitions discussed in the preceding paragraph, "availability" is often used when "capacity as a percent of maximum" better relates to the business purpose of such a measurement. The terms used are not so important as long they do not result in miscommunication. We will generally use the term "capacity." This is a contraction of "capacity as a percent of maximum." Furthermore, this may be indicated as a fraction instead of percent.

Current Practice

Historical plant performance is the basis for projecting future performance. Appropriate allowances are made to reflect changing physical and organizational conditions. The historical performance may be measured with availability, uptime (the complement of downtime), or simply the produced volumes measured over a time interval. When the measurements are rigorous, identical results are obtained. These measures are single-valued; that is, a single number describing the arithmetical mean is all that is known about the measure. The future plant capacity is actually a probability distribution. The actual plant capacity will vary due to chance, but this variability is undefined and not measured in current practice. Nonetheless, these single-valued averages are the foundation for production planning and setting reliability priorities.

Current State-of-the-Art

The current state-of-the-art for capacity and availability calculations for a plant is Monte Carlo computer simulation (or Monte Carlo-like simulations). One such use of Monte Carlo simulations was described in Plant Availability Measurement, Plotting and Simulation, by Jan Smith and Preston Rockhold, a paper presented at the International Conference on Process Plant Reliability-Europe, 1996, which is hereby incorporated by reference (this reference, however, investigated methods other than the use of detailed equipment data). This Monte Carlo simulation is not used in most plants because of accuracy and cost considerations. Distributions for time to failure and time to restore are determined for the individual equipment or subsystems that make up the plant. Random draws from these individual distributions allow the operating performance of the plant to be simulated numerous times. The composite simulations provide a probability distribution for plant capacity.

BRIEF SUMMARY OF THE INVENTION

The approach to determining a probabilistic forecast for capacity as shown in this patent application is not based on Monte Carlo or Monte Carlo-like approaches. It is an improvement to the current state-of-the-art in the following ways:

1. The current state-of-the-art method requires the time to failure distributions and time to restore distributions for the individual equipment or subsystems that make up the plant; however, these are seldom known. In practice, these data are often obtained by estimates and there is no way to check the accuracy of the resulting distribution shape. When estimates are used, this approach is only appropriate for comparing the relative results of different equipment configurations or operating strategies. The new process eliminates the need for this particular data. The new process uses commonly available accounting quality data.

2. Current Monte Carlo approaches commonly assume independence between a random draw for time to failure and that for time to restore. Any attempt to account for dependency requires the relationship between time to failure and time to restore to be known. This is usually unknown. Furthermore, any thorough treatment to correct for dependence is difficult and costly. The dependency between failures and their restore times is reflected in the new process. Any failure, and its respective restore time, are treated as an inseparable set.

3. The net effects of the improvements in current state-of-the-art made by this process are: 1) plant management access to a new set of business decision information, and 2) engineers are provided probabilistic data that allows an unprecedented level of analysis for reliability purposes.

Accordingly, a method is provided to determine the capacity distribution of a plant over a zone of interest, the zone having a time length P, the method having the steps of:

(1) gathering said plant's historical production data over a selected time period of length L, calculating TBF(k), TTR(k) for each failure (k=1,N failures) and creating the ordered cycle entries (TBF, TTR)(k), each of time length TTR(k)+TBF(k), from said production data;

(2) calculating the capacity (C(i,1)) for each contiguous portion of length P of the data;

(3) storing that calculated capacities C(i,1);

(4) randomly shuffling the calculated cycle entries;

(5) calculating the capacities (C(i,2)) for each contiguous portion of length P of the shuffled data set;

(6) storing the calculated capacities C(i,2);

(7) repeating steps (4)-(6) until sufficient capacities are stored to produce a robust capacity distribution; and (8) calculating a histogram from the capacities C(i,j).

The method includes a novel approach of computing the availability fraction for each entry in every cycle entry set, and using these cycle entries of availability fractions to calculate the capacity.

BRIEF DESCRIPTION OF THE DRAWINGS

FIG. 3 shows simple fictitious daily production of a plant for illustration.

FIG. 4 is a conceptual display of daily production to illustrate how reliability incidents (failures) are extracted from the daily production.

FIG. 5 is an analysis of FIG. 3 data showing extraction of TBF and TTR data and the information for the sensitive trend plot.

FIG. 6 is a plot of capacity cumulative difference for the illustrative data. This plot is similar to a CUSUM (cumulative sum plot) used in quality control and reliability applications to detect trends sensitively. This plot shows the method but is trivial.

FIG. 18 shows the (1) economic loss curve from having available power unsold (at a unit value of $11/MW, the market cost) over a number of sold contract values (expressed as a fraction of maximum capacity) (2) economic loss curve from having unavailable power sold (at a unit value of $15/MW, the market value) over a number of sold contract, and (3) the total economic loss curve, which is the sum of curves (1) and (2).

FIG. 19 shows a series of economic loss curves as in FIG. 19, but using different market costs and replacement costs to demonstrate the dependency of the total economic loss on the vale for the market and replacement costs.

FIG. 20 contains Table A depicting the calculation of the distribution for the case of a die with six faces.

DETAILED DESCRIPTION OF THE INVENTION

In the present invention, capacity will be discussed in terms of the available time for utilization and the actual time of utilization (as actual utilization/available utilization). However, the actual scope of the term is broader and includes availability, utilization and reliability, and other concepts familiar with those in the art. We will discuss utilization in terms of TTR and TBF, where TTR is the time to recover from a production failure and TBF is the time between productions failures. The total time between successive failures (failure I and I+1) is thus TTR(I)+TBF(I). This TTR(I)+TBF(I) defines a cycle, a concept which will be important later. In these terms, capacity is defined as $1-(\Sigma TTR(I)/Y)$; where TTR(I) represents the ith interval of downtime (time to recover from the ith failure) generally measured in days, hours, etc.) and Y represents the total time interval over which the capacity is to be determined, that is, $Y=\Sigma(TBF(I)+TTR(I))$, or Y=sum of all cycle times.

Note that capacity can equivalently be expressed in terms of the up-time, or time between failures as $\Sigma TBF(I)/Y$.

Figure 1:
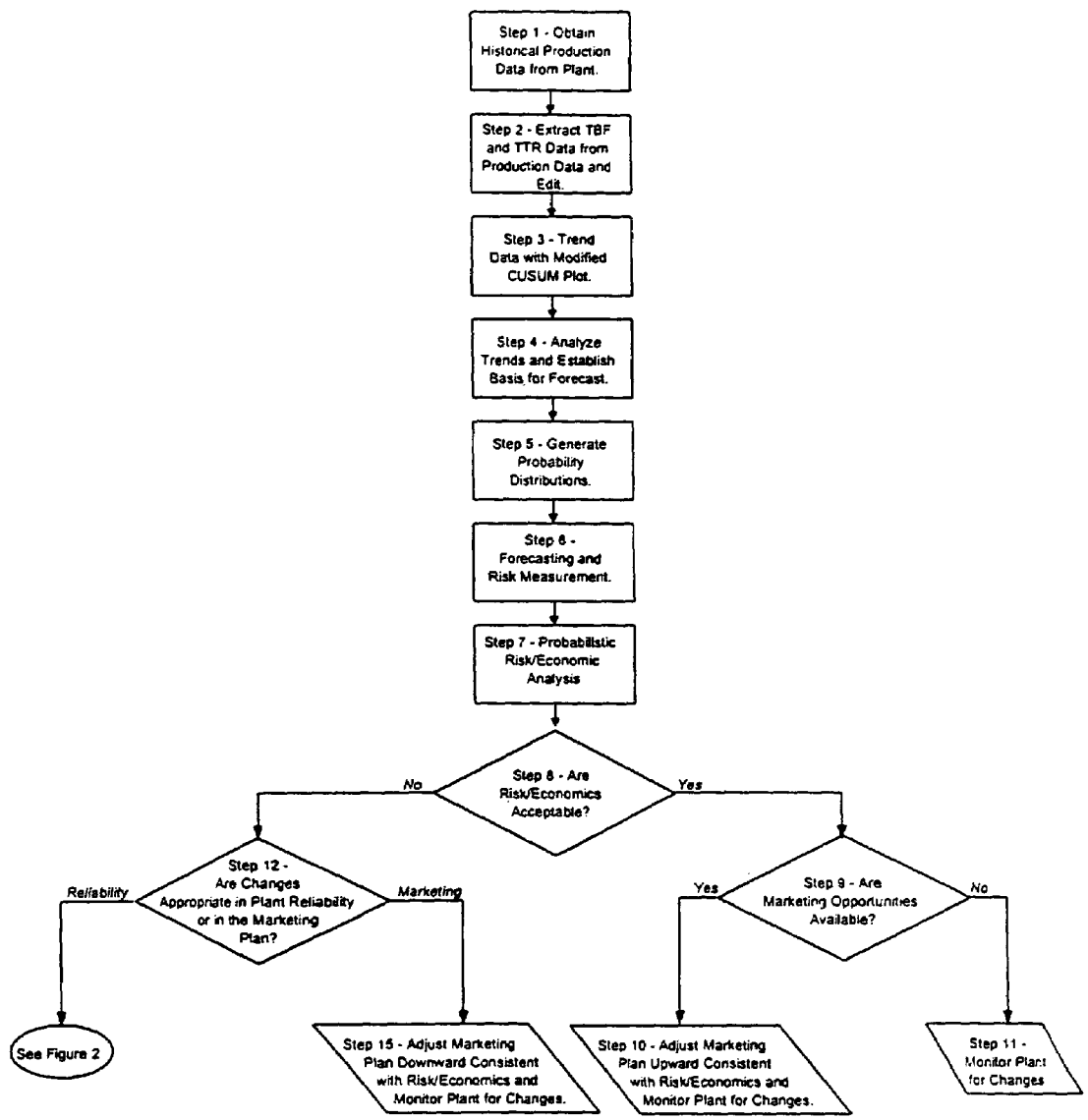
FIG. 1 is a flow diagram of the Capacity and Availability Assessment Process described in this application.
Figure 2:
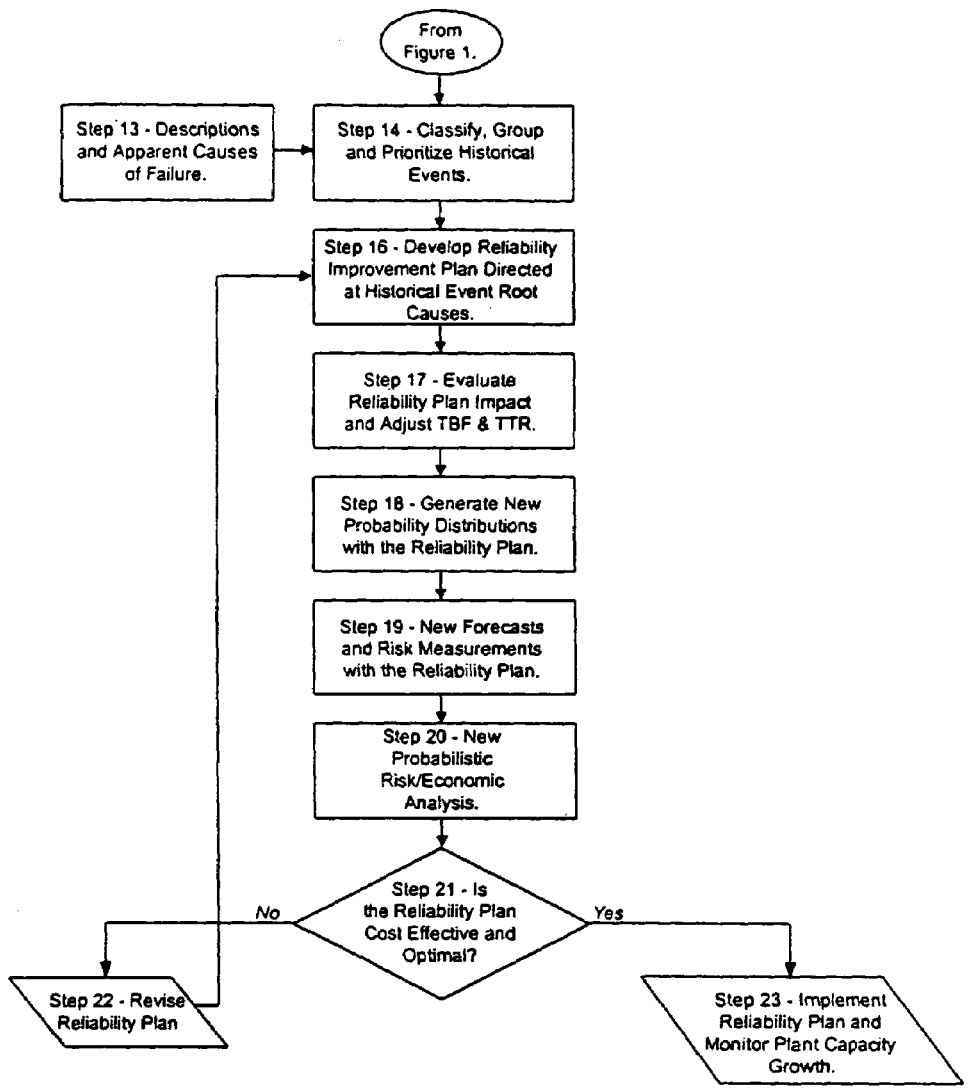
FIG. 2 is the above flow diagram continued.

The total process is described schematically in the flow sheet of FIGS. 1 and 2.

Step 1—

This step requires that the historical plant production data be compiled. By plant, we mean a manufacturing plant, sub-unit of a plant, assembly line or any plant where goods or services are created or assembled. This process is applicable for manufacturing plants that have some operating history. The production history is used to obtain the raw data for the process. In most manufacturing plants, production history is normally measured and records maintained for each day. Some plants may record production by shift or by hour. This process uses data for the smallest interval of time for which data is available. To simplify the following discussion, we assume the smallest time interval is daily. The daily production data of FIG. 3 will be used to illustrate the concept. It also demonstrates how useful probability distributions are obtained with only a small amount of data. "Historical" data for a new start-up plant will not be available, so "historical data": for the plant can include data from another plant used as an analogue, or a created data set constructed to reflect expected market and plant conditions. Likewise, such data may be supplemented by analogue or created data.

Step 2—

From the daily production data of FIG. 3, production failure events are identified. A production failure, or failure, shall indicate that production fell below a threshold level (threshold levels can change over time). Once each failure is identified, the time between failure (TBF) and time to restore (TTR) information are extracted. FIGS. 3 and 4 conceptually illustrate how the daily production is converted into TBF and TTR data. When production levels are not met on consecutive days, for ease of calculation, the consecutive days are considered a single production failure. For instance, as is shown in FIG. 4, a production failure occurs on day 5 and continues through day 6 (a day in this example is the smallest unit of data or record keeping). Over the interval of the first six days, there is one production failure. On day 5 and day 6, production was 700 units each day, while the threshold production level was 875. To determine TTR or TBF, it is more convenient to calculate TTR and TBF as a function of production units, instead of a "time" unit. For this purpose, we calculate a nominal production (the average of all daily production units above the designated threshold unit), and in these units, for instance, TTR=(Nominal Production−actual production)/(Nominal production). For ease of explanation and computation, we will assume that the nominal production for the data shown in FIG. 3 is 900 (in actuality, the Nominal production is 906.52). Thus, the TTR for days 5 and 6 is [(900−700)/900+(900−700)/900] or 0.444 "days," while TBF is 6−0.444, or 5.556 days. These calculations are reflected in the table contained in FIG. 5 (again, using a nominal production of 900).

The first six days constitutes one cycle, the total time between successive production failures. Note that the length of a cycle is not fixed as time between failures and failure restore times are not fixed. Cycle length, however, will be in whole numbers of the base measurement unit. Also calculated are cycle entries (TBF, TTR) for each failure, the cycle entry being of time "TTR+TBF," however, cycle length is always a "time" unit, even if TBF and TTR are defined in terms of production. Alternatively, a cycle could be defined as (TTR, TBF), that is, the cycle could begin either on a production failure, TTR, instead of beginning on production, TBF. Either definition is appropriate, however, it is important for a particular analysis, that once chosen, the definition of cycle is not altered. The remaining analysis will assume a cycle is defined as (TBF, TTR) which implies that the plant's history must begin during production time, and end in a production failure). A cycle entry represents one production cycle, consisting of plant production for a certain time TBF, followed by no or zero plant production for a time of TTR (in a later embodiment, partial plant production during a downtime or failure will be addressed). Each production failure has its associated cycle entry. Creation of a set of cycle entries from the production data results in a cycle entry data set, the set may be a complete set or a partial set.

As can be seen in FIG. 4, there are typical day to day variations in production for reasons as subtle as measurement error and atmospheric pressure and temperature. These are minor variations of no consequence and are separated from significant failure events using a threshold level as shown in FIG. 4. The threshold can be established at any and various levels in order to screen out minor system noise without missing real failure events.

FIG. 5 shows the TBF and TTR data extracted from FIG. 4. In practice, the data of FIG. 5 are extracted directly from FIG. 3 data. The data are edited to exclude any capacity reduction due to lack of sales, lack of raw materials or other events not attributable to the plant operation.

Steps 3–4—

These steps involve analysis/editing of the data set from step 2 to remove data points that are not relevant to future production. For instance, for a plant operating for several years, it may not be desirable to keep that portion of the data set which represents plant startup, as plant startup conditions may not be reflective of current operating conditions. Another instance requiring editing would be where troublesome equipment which resulted in periodic downtime, had been replaced with more reliable equipment. To more accurately project plant capacity, those down times associated with the replaced equipment might be edited out. Obviously, editing can be done on the raw plant data or on the ordered cycle pair data set.

Step 3—This step contains the preparation for the analysis of the data set to help decide what to edit. This step generally trends the historical data. The preferred method to analyze the data is to plot a variation of a cumulative sum plot (CUSUM) sometimes used for quality and reliability analysis.

The plot is especially sensitive to trends in data. A trend plot for capacity is developed for the production incidents of FIGS. 3, 4 and 5 as shown in FIG. 6. In this plot, each failure incident from FIG. 5 results in a data point, in addition to beginning and ending points. The plot points are determined in FIG. 5. The horizontal axis plot locations are, beginning at zero, the elapsed time (cumulative cycle time). The vertical axis plot points are, beginning at zero, the cumulative differences as defined in FIG. 5. Deviations of the plot from horizontal indicate deviations from the mean capacity for the entire period. Positive slopes between plot points indicate the capacity for the time comprised by those points is greater than the mean for the entire period; negative slopes indicate capacity is below the mean. The difference between the cumulative TBFs for the two locations divided by the difference between the elapsed time (cumulative cycle time) for the two locations is the capacity within the plot locations. Dates are associated with each plot location. The legend within the FIG. 6 plot indicates the capacity for a limited number of slopes. Capacities are not linear with the slope angle.

Figure 7:
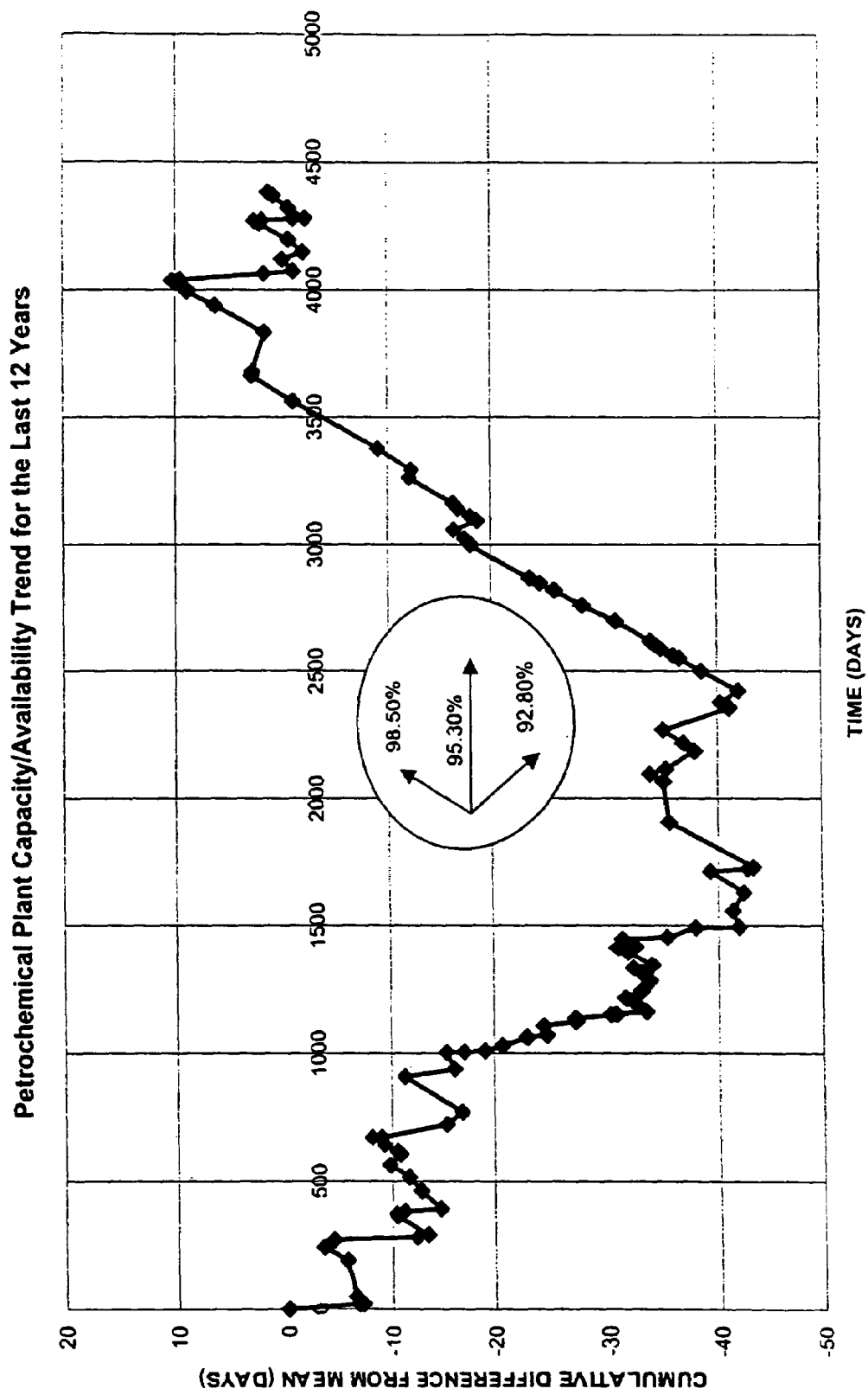
FIG. 7 is a capacity trend plot like FIG. 6 but for a 12-year period for petrochemical plant. Significant trends are readily detected.

Step 4—This step involves removing those data points found to be unreflective of future trends. The conceptual data of FIG. 6 are too simplistic to show the reason for this unusual though highly sensitive trend plot. The need for this sensitivity is seen from FIG. 7 showing data from a plant over a time span of 12 years. In this real data there is a period of very low capacity for the first 4.7 years. It may, for example, be appropriate to exclude this period from a capacity forecast if it is expected to be unrepresentative of future capacity. Capacity changes with time are not as clearly evident using conventional trending. Furthermore, failure events can be edited to remove or modify certain TBF or TTR to reflect plant correction of the problem which generated the respective TBF or TTR, whether a correction is experienced or anticipated. This step allows plant knowledge and engineering judgement to be used to modify any historical data before proceeding. It thereby establishes the basis for the probabilistic analysis.

Step 5—

This step involves the creation of the probability distributions. In practice, the distribution will be desired for a certain time window of length P, such as a year. The time window used in extracting the distributions should be selected with consideration for the purpose of the risk assessment. Most plants are concerned with making their production goals next year; therefore, a one-year window would be necessary. Should a plant have a forthcoming peak sales season expected to last three months, then a three-month window is necessary to assess their capacity for that season. In some instances, it may be useful to edit the historical data set so that only the season of interest is present: for instance, if summer production is the season of interest, it may be desirable to remove all past history of the plant outside the summer season. In this fashion, the calculated distribution may more accurately reflect any dependencies in the data set which are associated with the summer season.

In one embodiment, to determine the capacity distribution of a plant over a time window of interest involves the steps of (a second embodiment will be later described):

(1) calculating the capacity C(i,1) for each contiguous portion p(i,1) of length P of the cycle entry data set, where the capacity is calculated as $1-(\Sigma(TTR(I)$ within the portion $p(i,1))/P)$;

(2) storing that calculated capacities C(i,1);

(3) randomly shuffling the cycle entries (TBF,TTR)(I);

(4) calculating the capacity C(i,2) for each contiguous portion p(i,2) of the shuffled cycle entry data set as $1-(\tau(TTR(I)$ within the portion $p(i,2))/P)$ (capacities are generally not calculated when the moving length P window lacks entries because the window is at the end of the data set);

(5) storing the calculated capacities C(i,2).

Repeating this process for a sufficient number of iterations, and then creating a probability distribution, such as a frequency histogram (possibly normalized) of the calculated capacities C(i,j), (where j>2).

As used above, contiguous means in a time sense; that is, a contiguous portion of length P means any continuous portion of time length P of the ordered data set (TBF,TTR) (1), (TBF,TTR)(2), . . . (TBF,TTR)(N), or the shuffled ordered data set, when the ordered data set of cycle entries is considered as a linear ordered time line (TBF(1), TTR(1), TBF(2),TTR(2), . . . ,TBF(N), TTR(N)), or the linear time line of the shuffled ordered cycle entries (the "length" of the data set is N elements).

For ease of understanding, the above process can be conceptualized as follows:

The distribution will be built for a given window of interest, having a length P. The edited data set covers a time period of length Y, having N down times within that period, TTR(I), I=1,N, and the associated TBF(I), I=1, N and cycle times, where Σ(time length of each cycle)=Y(summed over all cycles in the data set). A time length is chosen to produce the distribution, where the time length is a whole number multiplier of length Y (and the multiplier may be several thousand, such as 10,000). This chosen length is then subdivided into contiguous intervals of length Y. Within each subdivided interval is placed the cycle events (TB, TTR)(I), I=1,N, in a random fashion, filling the interval. The placement can be made by a random number generator. Each interval thus has N cycle events placed randomly therein, each intervals placement being independent of any other intervals placement of events. This process produces an Extended Data set. Alternatively, the Extended Data set could simply include all permutations of the cycles, or a selected set of such permutations.

Figure 8:
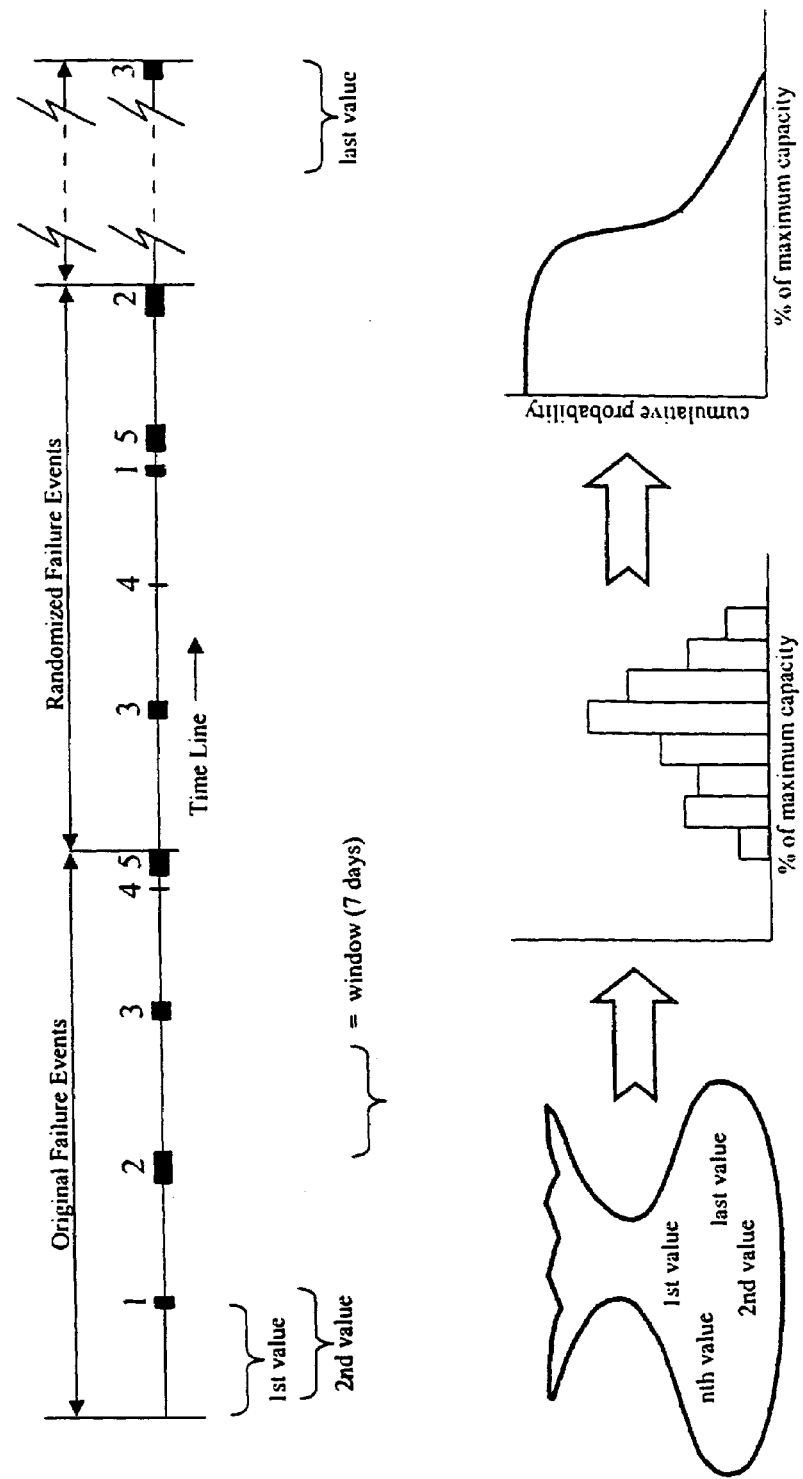
FIG. 8 is a conceptual representation of the process for obtaining empirical distributions. Shown is the method of increasing the number of data points by randomizing failure events and the method of obtaining the data points with a conceptual moving window.

Next, for each contiguous portion of length P of the Extended Data set, calculate the capacity of that portion as the capacity(j)=$1-[\Sigma(TTR(I)$ within portion)]/P. Alternatively, the capacity can be expressed as capacity(j)=Σ(TBF (I) within portion)/P. An easy way to make this calculation is to divide the Extended Data set into overlapping subsets of data, each having length P, where the first subset contains samples 1 through P, the second subset contains samples 2 through (P+1), the third contains samples 3 through (P+2), etc. This conceptual process is shown in FIG. 8.

Capacity and availability distributions are dependent on the window of time. The same data produces different distributions for different time windows. In our conceptual example of FIG. 8 the window of time is selected to be one week. The one-week window is positioned at the time line origin. The capacity for that week is determined and the value is collected. The window is advanced one day and another sample is collected. In FIG. 8, the length chosen is a 7-day period; the first contiguous portion, P(1,1), constitutes days 1–7, the next contiguous portion, P(2,1) constitutes days 2–8 (advancing the interval by one day), the next contiguous portion P(3,1) constitutes days 3–9, etc., and for each contiguous portion, is calculated the capacity C(i,1). As is also shown in FIG. 8, the data set over which analysis is performed includes the original data set, and a series of shuffled cycle data sets labeled as "Randomized Failure Events," resulting in an extended data set, generally needed to ensure that the analysis is performed on a statistically robust data set. This sampling has provided hundreds of simulations of one-week windows of plant operation. The values are developed into a histogram and finally probability density distributions and cumulative distributions, creating a first probability distribution. In some instances, there may be sufficient data in the plant's history to create the probability histograms and probability density without the need to create an extended data set of randomly shuffled cycles. Note that for actual implementation, the histograms are a series of bins of certain width, so that actual values of capacity will be placed in the most suitable bin (for instance, each histogram bin could be 0.001 plus or minus about a center value, so the bins centers would be 0.002, 0.004, 0.006, etc with bin 1 covering values from 0.001 to 0.003, etc).

Figure 9:
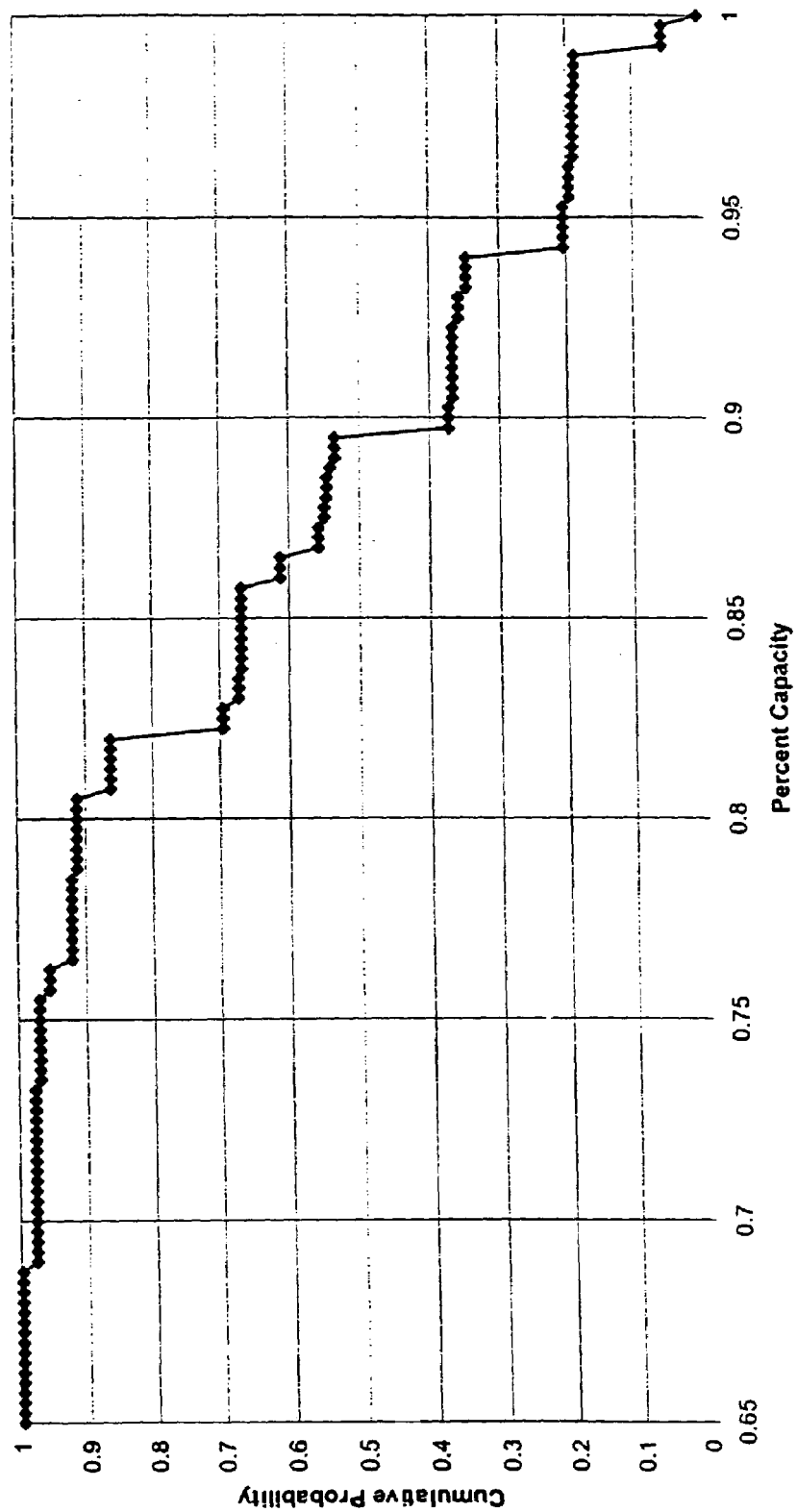
FIG. 9 is an empirical cumulative probability distribution of capacity for the fictitious plant from which FIG. 3 production data was constructed.

To examine the stability of the calculated histogram, step 5 is repeated with a longer length, say 2*Y, resulting in a second histogram. The two histograms are then compared for differences. The comparison may be visual, or some metric used to compare the difference in the two sets, such as the absolute value of the set differences of the capacity probabilities, comparison of means, comparison of standard deviations, etc. This process is repeated (creating histogram (I) and comparing with prior histogram(I−1)) until the comparison shows that the two histograms tested are acceptably "close," indicating that the sequence of probability distributions is converging onto the desired probability distribution, and that the last calculated distribution is a "good" approximation to the desired probability distribution. Instead of comparing frequency histograms, normalized frequency histograms could be computed (a probability distribution) and used to test for convergence, or stability of the histogram sequence, or cumulative probability capacity histograms could be computed (as shown in FIG. 9) to test for convergence, or other types of histograms could be used to determine convergence. Histograms, in this sense are used interchangeably with the term distribution. As a final step, the "final" histogram (or intermediates) can be displayed for analysis, or transferred to another program for further use.

Figure 10:
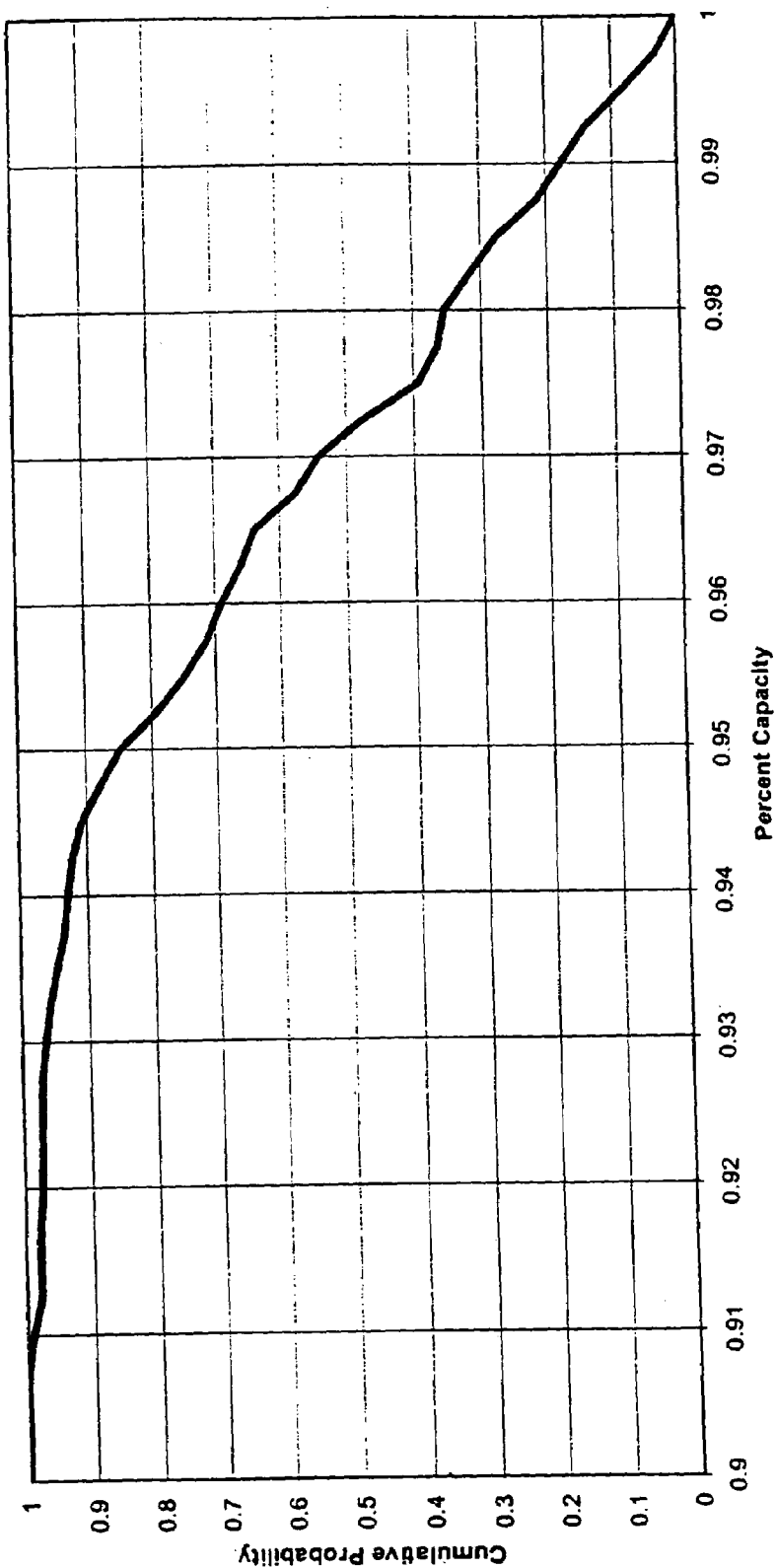
FIG. 10 is an empirical cumulative probability distribution of capacity for the petrochemical plant from 7.3 years of daily production data.

In the described embodiment, the above process is conducted in a computer-spread sheet. The cumulative distribution for our example data is seen in FIG. 9. From this distribution we can determine the probability of achieving any capacity level during a future week; however, we must remember that the basis for the distribution was the one-month of plant operation shown in FIG. 3 with only five failure events. Except for illustrative purposes, this may be inadequate data to characterize the plant. FIG. 10 is the cumulative distribution for the petrochemical plant data of FIG. 7 with the first 4.7 years edited out as discussed in step 4. The distribution is based on a window of one year. The data span about 7.3 years and are adequate to characterize the plant. The variability reflected in the capacity distribution is absolutely determined by the historical variability embedded in our data. Unusual events not in our historical data will not be reflected in the forecast unless the historical data are modified as discussed in step 4.

Step 6—

Forecasting and risk measurement are illustrated from FIG. 10. The 7.3 years of historical data have not been modified; therefore, the distribution we are forecasting for the future is identical to that which was actually experienced during that time. In the event we believe the future reliability of the plant is either better or worse than the prescribed history indicates, then we should either go to step 4 and modify our historical data, or conduct a limit analysis in which our results would establish levels at which we expect to be beyond or within. A rare catastrophic event may not be contained in 7.3 years of data. It can be added, but if not, it will not be reflected in the forecast. From FIG. 10 the probability of achieving any capacity is obtained. To illustrate, there is about a 50/50 chance of obtaining 97.2% of maximum capacity over an upcoming 12-month period. There is a 10% probability that capacity may be below 94.5%; however, there is a 35% probability that capacity will exceed 98%.

Step 7—

This step involves placing value on the expected probabilities, such as monetary value. This step includes evaluating the costs of a percent change in plant capacity, and valuation may be a non-linear process. Generally, a value can be placed upon plant capacity, simply in terms of valuation of the product. However, valuation should begin at a valuation of the plant's product, and consider downstream consequences of failure to produce product. For instance, will product have to be purchased during a downtime to meet commitments; will contract facilities have to be maintained during downtime at increased costs? The valuation step is highly dependent upon the individual plant, and the total market conditions in which that plant operates. Once valuation is done, the forecasted probabilities can be examined in light of the valuation to determine the economic risks or expected losses or gains. For example, one method to determine economic risks is to calculate (probability of occurrence)*(cost or value of occurrence).

Step 8—

This step involves a management decision as to whether the risks are within acceptable limits. For instance, it may be that the plant needs to operate at 90% capacity to meet product commitment within the next six months. The probability of the plant capacity falling below 90% is 3%. Generally, a 3% probability is low, but if the costs of failing to meet the product commitment are in millions of dollars, the risk may not be acceptable.

Step 9—

In step 9, it has been determined that the risks are acceptable, consequently, there may be an excess plant capacity that management may wish to market by adjusting its marketing strategy (step 10).

Step 11—

In step 11, it has been determined that the risks are acceptable, with no additional marketing opportunities, and it is now necessary to monitor the plant performance to ensure that production goals are achieved.

Step 12—

In step 12, the risks have been found to be unacceptable, so that either reliability must be improved, or production goals reduced (step 15).

Step 13—

This step is to accumulate another data set that identifies the apparent cause of each production failure. This data set is developed from plant records and interviews. Each production failure is thus assigned an apparent cause.

Step 14—

This step is grouping production failures into various groups, being determined by the judgment of the reliability analyst. For example, all pump failures could be grouped to measure the reliability impact of pump failures. Groups can be made by failure mode, or any other manner that aids analysis. However grouped, the groups can be prioritized to allow corrective actions to be directed at the most effective reliability improvement opportunities.

Step 15—

This step adjusts the marketing plan for lower plant capacity. This step essentially reduces a plant's customer commitments to assure that there is an acceptable risk of failure to meet customer orders.

Step 16—

This step is developing a reliability improvement plan. The prioritized failure groupings from step 14 are useful for this purpose. The plan includes estimating the improvement in TBFs and TTRs.

Step 17—

This step reflects editing the historical data set to reflect the reliability plan TBFs and TTRs.

Steps 18–23—

These steps reiterate the capacity assessment method until an effective reliability plan is developed.

Consideration of Each TTR as a Set of Values

A broadened application of the above method includes retaining the fine structure of the TTR, instead of considering TTR as single-valued number. In a downtime incident, a plant may still produce output, but with production output below the normal expected or desired level. For instance, an electrical generating plant may still generate electricity during a "failure," but at reduced levels.

To retain the actual structure of a failure in the data analysis, each TTR will be considered as a set of values TTR(j) (where j is the index running over the number of time intervals within a particular failure event). As before, it is convenient to calculate the value of a particular TTR(J) as a function of production normalized units, instead of a "time" unit. For this purpose, TTR(J) can be defined in terms of a ratio of the lost production with respect to the normalized units (referred to as Maximum Production)(Maximum Production can refer to "Normalized Production" as previously described or some other normalization number, such as maximum capacity, expected capacity, average of all failure-free days in the historical record, plant name plate capacity, etc.) or the complement of the lost production percentage– the actual production percentage. That is, TTR(J) is expressed as a fractional value for each time interval in a particular failure event, either as (a) (lost production)/(Maximum Production) during the time interval associated with the Jth entry (b) (actual production)/Maximum Production) during the time interval associated with the Jth entry.

Figure 11:
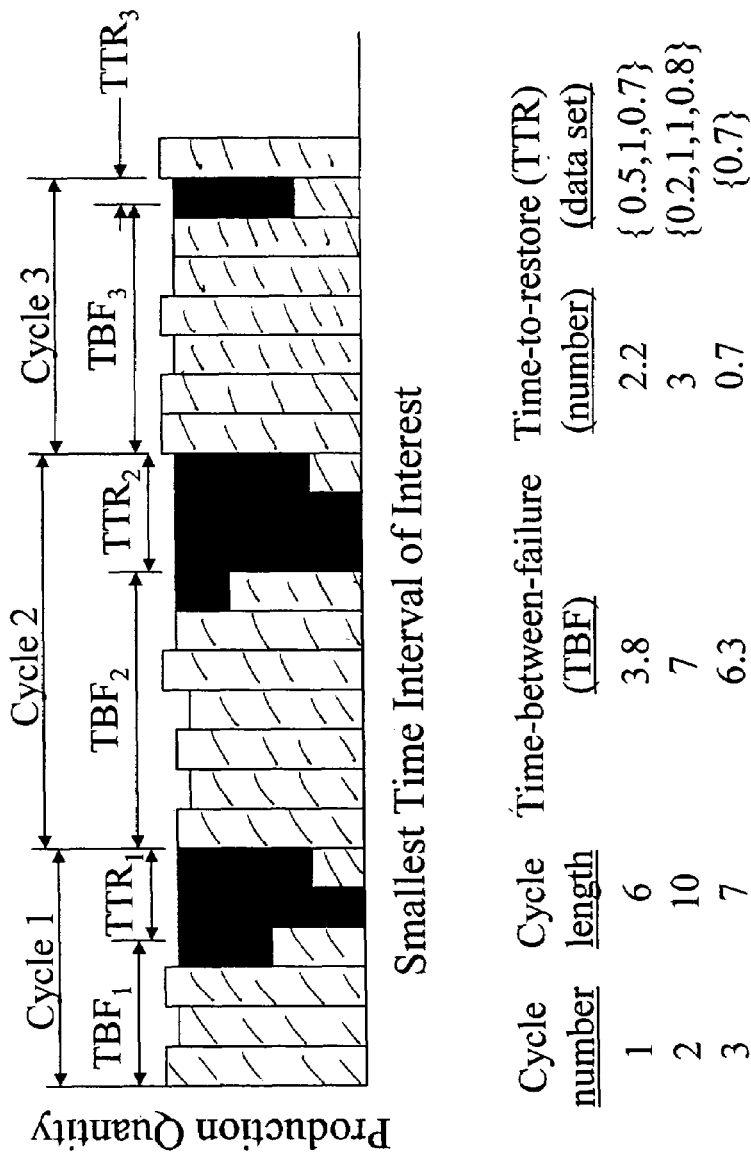
FIG. 11 shows fictitious plant data for three cycles showing computation of TTR as a single number and as a data set TTR(k).

FIG. 11 illustrates the data set concept. Production is shown "crossed hatched" in this figure. Lost production, due to reliability incidents, is shown in dark gray. An availability cycle can be defined in various ways, but for this example will be defined as measured from start up following an outage or failure to start up following the next outage or failure, that is, one cycle is the TBF followed by TTR. The cycle length (the time corresponding to period TBF+TTR, as an example, if TBF starts at day 6 and ends at day 9, and TTR starts at day 10 and ends at day 11, the "length" of the cycle is 6 days, from day 6 to day 11) is always a "time" unit, even if TTR or TBF is defined in terms of production or production or fractional production, and cycle length is an integer multiple of the smallest time interval of interest, such as day or hour. The smallest time interval of interest (STII) is defined to be either the smallest time interval of plant data measurement, or a fixed length (that is, a multiple of the smallest time interval) of data measurement times.

For instance, in the previously mentioned "step 1" the process uses data for the smallest interval of time for which data is available. However, such a time increment may be too limiting and the actual data set may need to be decimated. Data may be available that are in intervals of time much smaller that that of interest. For example, electric power generation plants may have production data measured in seconds, but a half hour or one-hour interval is sufficient data for many power plant applications because the average power generated in half or one hour increments appropriately capture the demand cycles.

In cases where it is determined that the smallest time interval is too fine, data decimation should be undertaken. Data decimation can take a variety of forms—once a suitable time interval of interest (the STII) is chosen, the plant history can be divided up into the chosen STII intervals and all data within each STII interval can be combined (such as by an average, weighted average, median or other data reduction process) and posting the result as the plant data associated with the particular STII interval. The process is similar whether the smallest time interval of interest is days, hours or seconds; unnecessarily small intervals, however, increases computational demands.

In FIG. 11 the TTR information (as time information) is presented as both a single number (the sum of all the lost production time during the failure event, which occurs over several STII) and as a set of numbers representing the lost production time per STII during the failure event. The fraction of lost production time during each STII time period is shown as the entry of the data set for TBF and TTR. (For simplicity, we assume that there is no deliberate reduction in production throughput (for instance, through reduced demand) and that all production reductions are a failure of the production system. Any such deliberate reductions may be edited out). The TTR for the first failure is 2.2 "time" units or STII (days will be used as the chosen STII for clarity of presentation). From the production pattern of FIG. 11, we can see the data set TTR(j) for the first failure event is {0.5, 1, 0.7}. This represents 0.5 fractional downtime (50% loss of production) during the first day of failure event 1, full fractional downtime (100% loss of production) during the second day of failure event 1, and 0.7 fractional downtime (70% loss of production) during the third day of failure event 1, which is the equivalent of 2.2*STII (here considered as 2.2*day).

Figure 12:
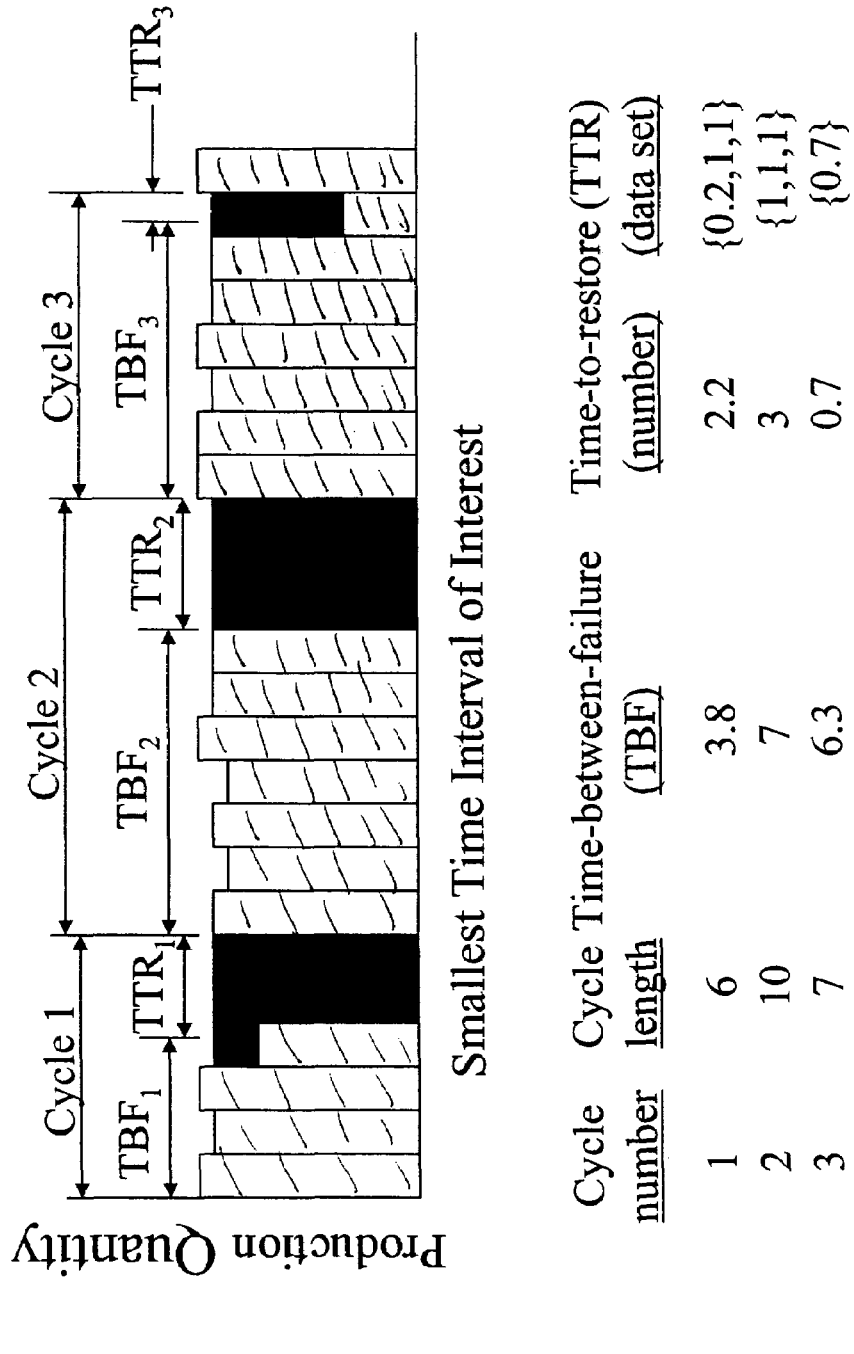
FIG. 12 shows the fictitious plant data in FIG. 11 showing

FIG. 12 illustrates how the production data of FIG. 11 would "appear" when using a single-valued TTR number. The difference in the two methods of treating TTR can be seen visually by comparing FIGS. 11 and 12. The data sets in FIG. 12 differ from those of FIG. 11 in two of the three example failures due to the lumping or collapsing of the lost production. For instance, in the first failure event of FIG. 11, a failure event begins during the 4$^{th}$ time interval where production decreases to 50%, continues into the 5th time interval (with total loss of production), and ends in the 6$^{th}$ time interval, where production restarts, but 70% of production was lost. This multiple stage failure event, when characterized with a single TTR or considered a single-valued "event" as shown in FIG. 12, collapses the failure (time intervals 4–6) with production loss during the entire failure event back loaded and actual production front loaded into the failure sequence. As shown in FIG. 12, this shifting of production results in complete production loss in time intervals 5 and 6, and moving the actual production of time period 6 (which is 0.3) to the beginning of the failure event (time period 4), resulting in "actual production" of 80% (0.50+0.30), or a production loss of 20% (0.20) in time interval 4.

As can be seen, in a failure which extends over move than one STII time interval, lumping the production data results in a loss of information in the actual plant production. It is apparent that the moving window averaging concept demonstrated in FIG. 8 would result in different numbers when applied to FIG. 11 and FIG. 12. Considering TTR as a data set allows the actual plant production losses to be captured as a pattern and that pattern to be reflected in the resultant probability distributions.

The actual implementation of utilizing the fine structure of a failure event (i.e. considering each TTR as a data set) is more conveniently accomplished when plant production data associated with each and all STII intervals are associated with the actual production occurring in that time interval (as opposed to lost production in the time interval) as a fraction of the normalized production, that is, plant production of each STII, whether the STII is associated with TBF or TTR, is associated with (actual production/Maximum Production) (obviously, the method could be employed using (lost production/Maximum Production)). Thus, each STII has associated with it with a fraction representing a percentage of the "Maximum Production" or a percentage of full utilization. Each STII now has associated with it, not the fractional lost production, but its complement, the actual production fraction (as measured from a Maximum Production value), and the entries can be considered an "availability fraction":

Availability fraction=uptime fraction=(1−downtime fraction)

(note, that in general, TTR is considered a measurement of "downtime", not uptime, and hence we will use the term ATTR for a "TTR" set of uptime availability fractions. If downtime fractions are used, the entries represent "unavailability" fractions.

Table 10 shows the conventional single-valued TTR data and the replacement data sets or "availability TTR data set, or ATTR."

TABLE 10

Comparative forms for the data of FIG. 11 for each failure event

| Conventional TTR data | TTR data set (lost production) | Availability TTR data set, (ATTR) |
|---|---|---|
| 2.2 | {0.5, 1, 0.7} | {0.5, 0, 0.3} |
| 3 | {0.2, 1, 1, 0.8} | {0.8, 0, 0, 0.2} |
| 0.7 | {0.7} | {0.3} |

As mentioned, it is computationally easier to calculate the capacity by using the "availability fraction" for each STII, even those not associated with a failure, that is, the plant data associated with TBF or time intervals without failure. A value of 1.0 is applied to each STII within the time intervals represented by TBF (1.0 implies full production during the particular STII) and that are not already defined as a complement of the TTR data set as in Table 10. By example, the first cycle of FIG. 11 has a TBF "availability data set" of {1.0, 1.0, 1.0} after which the ATTR data set of {0.5, 0.0, 0.3} comprise the six STII that fully describes the performance and non-performance associated with that particular cycle. These "availability" TBF data sets will be called ATBF.

The overall preferred process now involves the steps described in the previous method, with an alteration in step 5. As before, it may be desirable to edit the plant data as needed, for instance a plant production data may be considered against a threshold to identify failure events—production above the threshold value is considered as full production, disregarding production variations above the threshold while production below the threshold is considered a potential failure event. The potential failure event is examined to determine if indeed it was a true failure or a production reduction for some other reason, for instance by examining the particular time and duration from maintenance records, operator logs, etc. Otherwise, potential failures are identified by applying a threshold value. A further "edit" of the actual plant data will be data decimation, by selecting the STII (if data decimation or compression is required) and suitability decimating the plant data.

The modification of step 5 occurs in converting the cycles (TBF, TTF) in the plant data to the cycles containing availability fractional entries (ATBF, ATTR) or a cycle entry set of availability fractions (again, instead of uptimes, the complement, lost production of downtime could be used). Each cycle is considered a series of STII intervals with an associated plant production figure. For each STTI in the TBF sequence of a cycle, every time entry in the sequence will be replaced with 1.0, creating the ATBF sequence; for each STII in the TTR sequence, each time entry will be replaced with (actual production)/(Maximum Production) to create the ATTR sequence. By using this procedure, the plant's history time line, considered as a set of (TBF, TTR)(i) is reduced to a sequence of STII time intervals where each interval has a number (between 0.0 and 1.0) associated with that interval which number represents the plant's availability fraction during that STII time interval. The associated availability for each interval is thus the capacity for the same interval, where capacity is a contraction of the term percent of maximum capacity as discussed in Prior Art section. Consequently, a particular cycle is now represented as a sequence of entries, where each entry "C" is the "availability fraction" of the time interval, and hence is in the range $0.0 \leq C \leq 1.0$ (At the bottom of figure, FIG. 13 is shown the availability fractions for each of the STIIs for the data in FIG. 12).

A further modification in step 5 is in the formula used to calculate the capacity. The capacity is now calculated using a suitably modified definition equation for "capacity" from the set of cycles composed of availability fractions, (ATBF(k), ATTR(j))(i). To determine the capacity over a window of interest of length P, the plant's time line history of availability fractions is divided into periods of P contiguous time intervals. For each window, the capacity is determined as $(\Sigma(ATBF(k)+ATTR(j))$ for those time intervals within the P length window)/P (note, the length of ATBF(k)+length of ATTR(j)=length of cycle). The previous definition of capacity was $C=1-(\Sigma(TTR(i,j))$ for those time intervals within the P length window)/P—but the two calculations yield the substantially the same result, as follows: $C= (\Sigma_{uptimes\ and\ downtimes} ATBF(k)+ATTR(j))/P$=average availability in time window=$((\Sigma_{uptimes}(ATBF(k)+\Sigma_{downtimes}(1-(TTR(j))))/P)=(\Sigma_{uptimes}1+\Sigma_{downtimes}(1-(TTR(j))))/P= (\Sigma_{uptimes}1+\Sigma_{downtimes}1-\Sigma_{downtimes}TTR(j))/P= (P-\Sigma_{downtimes}TTR(j)))/P=1-(\Sigma_{downtimes}(TTR(j))/P$, (as there the total number of intervals, both uptimes and downtimes, should add up to the length P, the window length over which the sum is taken). The difference in the two methods is apparent in the distribution of data within the windows, which distribution produces slightly different results for windows of short lengths, that is, the new method produces a fine tuning at the edges of a particular window. For large windows, say 6 months, the addition of considering ATTR, or a set of TTR, will have only modest or no impact. Consequently, calculation of capacity as $1-(\Sigma(TTR(i,j))/P$ yields the same result as $(\Sigma ATBF(k)+ATTR(j))/P$—the difference in the new embodiment is that of retaining the production data as actually distributed within the data set, that is, the data set from which the capacity is measured is different. The formula for calculating the capacities, while different, produces (either with availability fractions or TTR) equivalent results. If instead of a set of cycles of availability fractions, the cycles consisted of unavailability fractions, then capacity is determined as before, $C=1-(\Sigma (TTR(i,j))$ for those time intervals within the P length window)/P, where each TTR(i,j) entry represents the unavailability fraction for a STII (there is no need to sum over the entries for TBF, as a TBF unavailability fraction entry in this case is 0.0).

Figure 13:
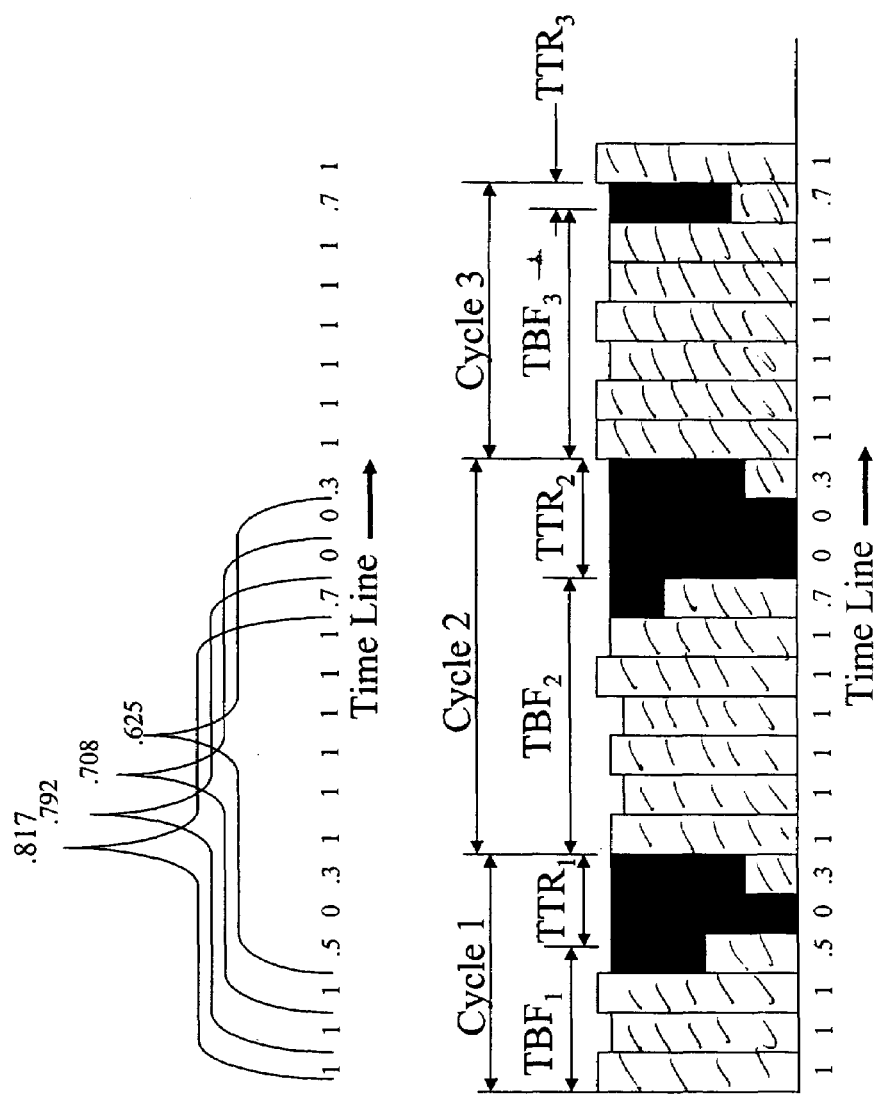
FIG. 13 shows the plant data of FIG. 12 with each STII associated with its availability fraction, and the calculation of the capacity data using a window length of 12 STIIs.
Figure 14:
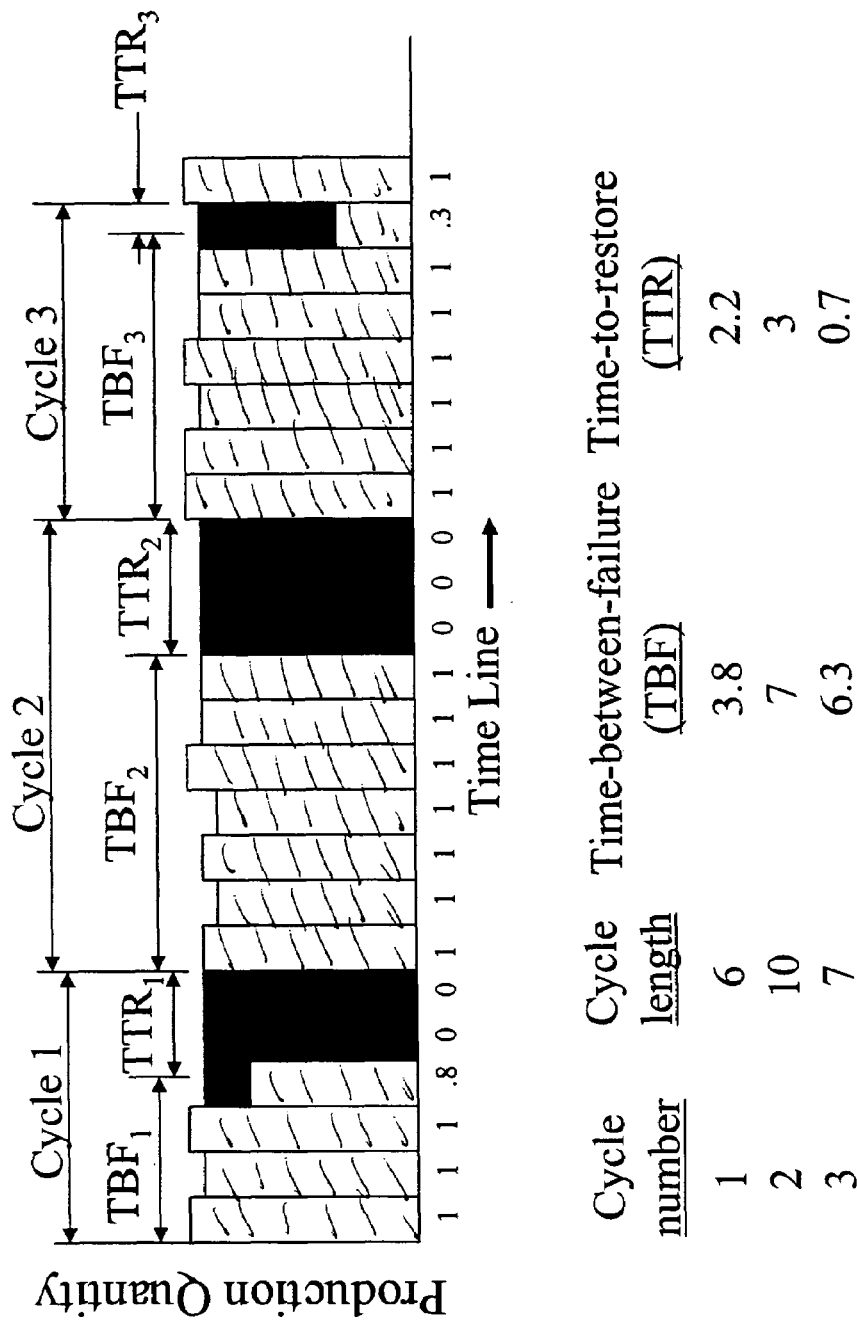
FIG. 14 shows the plant data of FIG. 12 using the availability fractions to evaluate capacity in conjunction with the prior method of determining TTR where plant performance data was redistributed in the TTR sequence.

For instance, the calculating the capacity for a time window of 12 days on the data of FIG. 13 is demonstrated at the top of FIG. 13. For the first 12 days, that capacity is 0.816; advancing 1 day and repeating the calculation results in a capacity of 0.792, and so on. The advancing window returns values of the availability random variable that is different from what would be returned if TTR were treated as single-valued as in FIG. 14 because the availability fractions for the time line of STIIs are different from those of FIG. 13. Advancing the time window along the time line of FIG. 14 returns an identical value for the first 12 days, but a value different from that of FIG. 13 in the second time window position. Availability fractions for day 2 through 13 average 0.792 in FIG. 13 and 0.817 in FIG. 14. The data within the window is different. The value returned at each position of the window is the average fraction within the window. When time windows are short, the difference in the failure patterns of FIGS. 11 and 12 are most important. Also, failures that result in partial reduction in production rates for an extended period of time make treatment as in FIG. 13 important.

The concept of cycle is still important, for each sequence of numbers within the plants is history is associated with a single cycle. To create a lager data set for computing the distribution, data can be duplicated, but must be moved in blocks of cycles (that is, random shuffling of the plants data still may have to occur, but the shuffling must take place as if shuffling a cycle composed of (ATBF(j), ATTR(k)). Consequently, the procedure is substantially the same, but uses cycles of (ATFB(j), ATTR9(k)), and using the calculating the capacity as $(\Sigma ATBF(k)+ATTR(j))/P)$.

General Utility

Availability fractions for each minimum time interval of interest along the time line are necessary when the data within the failure loss pattern are to be used. This technique can be utilized even when TTR data are treated as single-valued. By using availability fractions for each minimum time interval of interest, regardless if considered an "uptime" or a "downtime" (i.e. in production or in a failure event), the process of computation is more efficient. By calculating an availability fraction for each minimum time interval (that is, each time interval will have an availability associated with it, that being ATTR as calculated, or 1.0), the plant's history is converted to a sequence of numbers between 0.0 and 1.0. The associated availability for each interval is the capacity for the same interval. To calculate the capacity using a window length greater than the minimum time interval, is simply to simply period of interest can then be advanced in the manner of FIG. 13, which is simply a moving average along the time line. This method is compatible with TTR in data set format or TTR as single-valued numbers. It is computationally easier than calculating availability within each time window as in the original patent.

The method is generally implemented using a computer with storage to store plant data, calculate the capacities, and construct the histograms.

Special Case: Window of Interest Equals Minimum Time Interval

For plants producing a tangible manufactured product which can be stored or inventoried, the time windows of interest are usually greater than the minimum time interval. For applications for which there is no product storage, such as electric power generation, availability and capacity for the STII is of special importance. When the window of interest equals the STII, the concept of shuffling TBF and TTR data cycles to generate extended cycle entry data sets is not useful because new permutations of cycles or failure sequences fail to produce new information. All information is contained within the unshuffled (ATBF(j), ATTR(k)). No information is added by shuffling and extending the data set in this special case. Only for time windows greater than one STII is it helpful to extend data sets by shuffling to add additional permutations to the data set.

Furthermore, whereas generally production data is used to extract failures that are defined with cycles of TBF and TTR (single-valued or data set), in this special case, the production data alone can be used directly to obtain availability and capacity distributions for a time window equal to the STII. In this case, the availability distribution is obtained by converting the production in each time window to an availability fraction, as discussed above. TBF and TTR need not be defined. We only need to know that a failure did or did not exist at each STII, then obtain the availability fraction for each STII. An electrical generating plant will be used to demonstrate the method.

Figure 15:
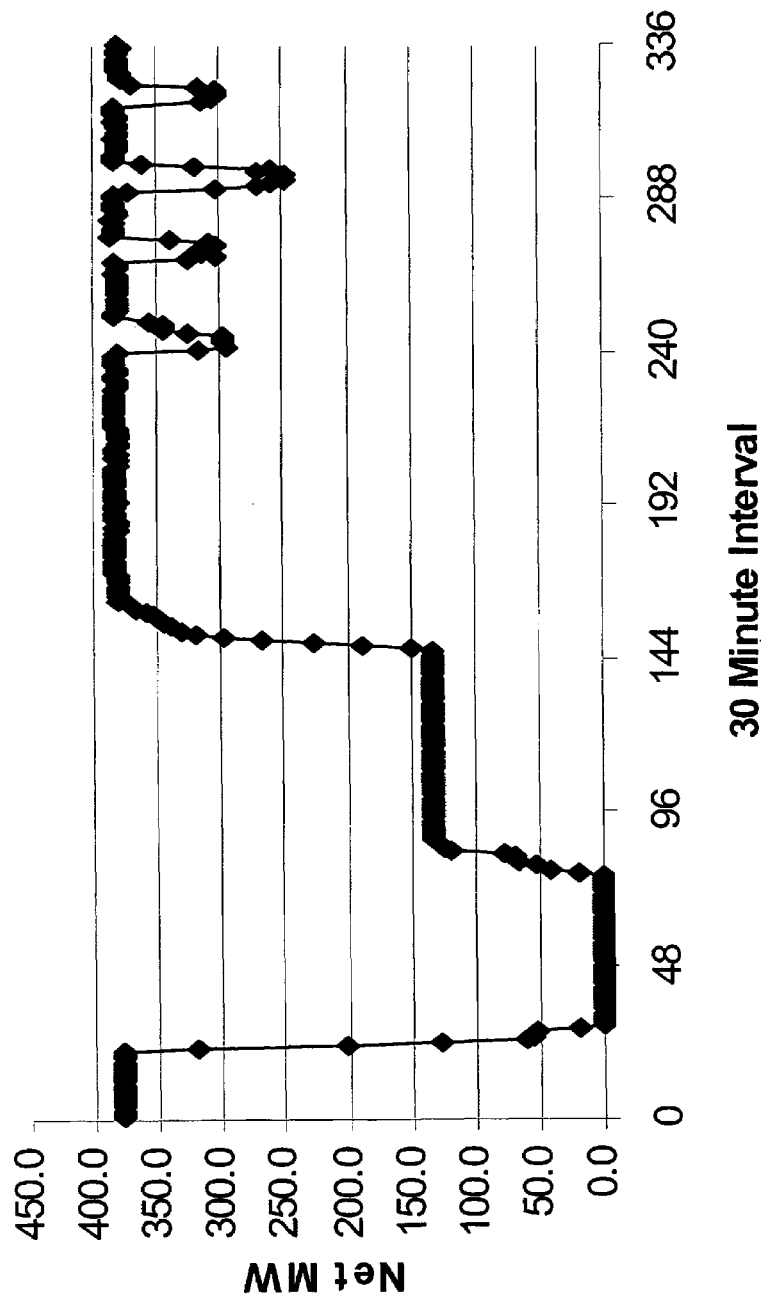
FIG. 15 shows a MW generation history for an electrical plant over 30 minute time intervals

FIG. 15 is a plot of power generation data from a 400 MW generating unit for a 7-day period. Power generation data are usually computer recorded every few seconds; however, demand fluctuations are typically such that the STII is often one hour or ½ hour. For purposes of example, the data of FIG. 15 have been consolidated so that each generation value is the previous 30-minute average; therefore, each day has 48 data points. The 7-day period requires 336 data points. As is seen in FIG. 15, there are about 2.5 days of equivalent outage in the first three days which is associated with a forced outage caused by a failure of the system. There are additionally four brief reductions in generation rate in the last two days, however, these reductions were associated with reduction in demand, not forced reduction. These reductions in rate that are not associated with a loss of generating capacity (i.e., a forced outage) do not reduce availability and may be removed from failure consideration by proper editing of the data set. For instance, in the case of an electrical generating plant, maintenance or other log of failure events and their time and magnitude may be related to the generating log to recognize true forced outages as opposed to load reductions. Additionally, the time of day, the cyclical nature and the duration and amount of the generating capacity reduction may allow a load demand reduction to be surmised in the absence of other documentation.

Table 11 is power generation data for the first 16 hours of Dec. 17, 1999 from the first day of FIG. 15 production data. This table will be used to illustrate the procedure for obtaining the availability fraction for each STII. The production during each interval is compared to a threshold value. The purpose of using some type of means to threshold is to distinguish between forced outages and demand reductions and to assure that demand reductions do not reduce availability. If the production is above the threshold, the availability fraction is "1.0". If it is below the threshold there is a potential forced reduction in production that is subject to editing to identify true failures. The availability fraction is then the ratio of the actual production to the rated or trouble free production which we have earlier called maximum production. As before, the availability fraction is defined in terms of production, not with it complement, production loss. A relatively small amount of power is used within the unit producing the power, so there typically will be a recorded log of both gross and net power produced. The basis for the STII availability calculations in Table 11 are net power.

Figure 16:
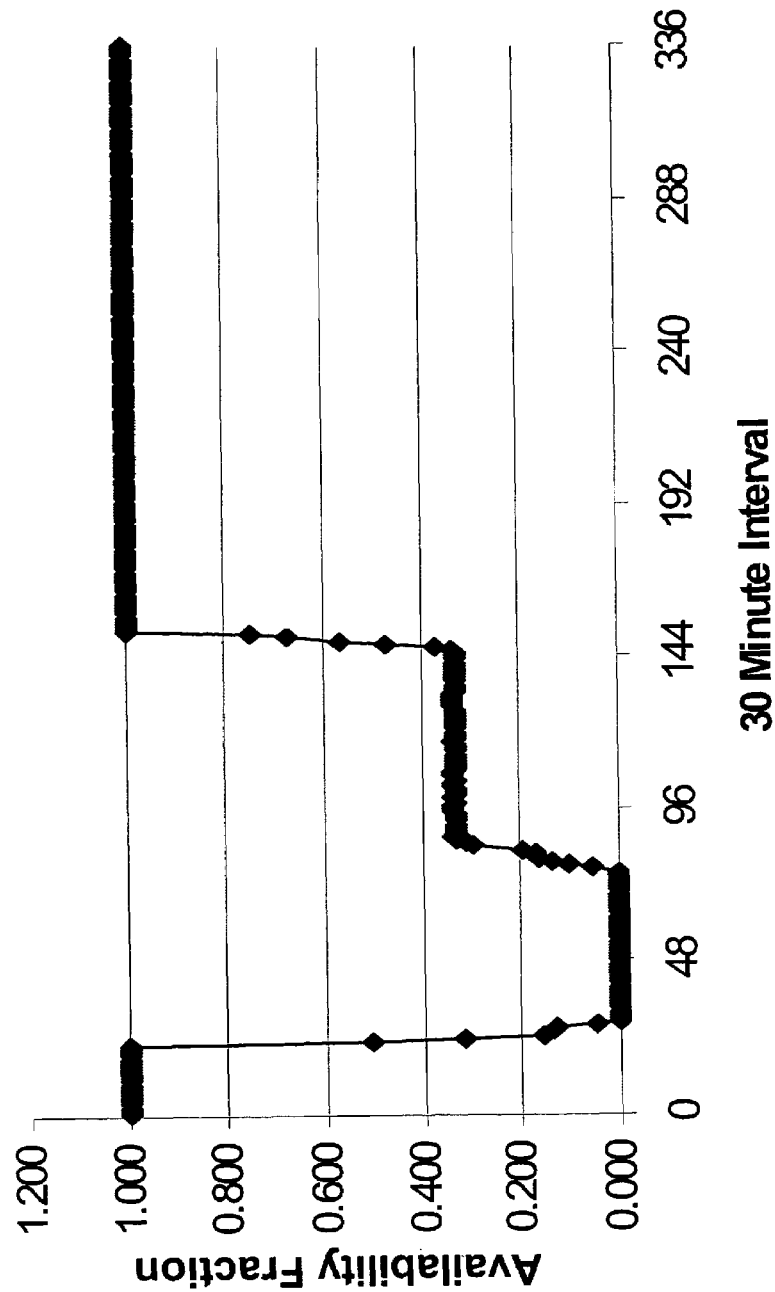
FIG. 16 shows the availability fractions calculated form the data set in FIG. 15 are thresholding the FIG. 15 data set.

FIG. 16 is a plot of the availability fractions computed from FIG. 15 data and using the procedure described above. FIG. 16 demonstrates (1) editing or thresholding of the data set (particularly in time intervals 240–336) to remove the loss of capacity associated with a load reduction, and (2), the computed availability fractions. The threshold procedure can implement varying thresholds levels to correspond with known losses due to load reductions. The use of different values for the threshold allows availability values to be captured accurately where forced outages occur; yet the demand reductions can be effectively filtered out so that they do not contribute to unavailability.

Availability fractions for the 7-days of FIG. 16 are too few to form meaningful cumulative availability histograms. However, in two years of production history, there are 2*365*48 or about 35,000 availability values for each 30-minute period (minimum time period of interest). These form useful histograms. Where true data is lacking, data may be taken from an analogous plant, or created, such as with Monte Carlo simulations or other procedure.

An additional example demonstrating the method will be calculating the empirical availability distributions for a system of multiple generating units. For instance, by combining the availability fractions for each units comprising the system, a combined (using a suitable normalization method) availability can be developed. For instance, consider the 4 unit generating system of Table 12, having two 400 MW generators, a 200 MW generator, and a 300 MW generator. For 8 time intervals, (STII), the availability fraction for each generator, considered as a stand alone unit, is shown in the column marked "Unit Avail." Then, the availability fraction for each generator is weighted according to the percentage of that generator's contribution to the system generating capacity. For instance, each 400 MW generator would be weighted by a factor of 400/1300 (1300 MW being the total system generating capacity). This weighted availability fraction is shown in the column marked "Weighted Avail." The system availability fraction time line is the sum of the weighted unit availability fraction.

Figure 17:
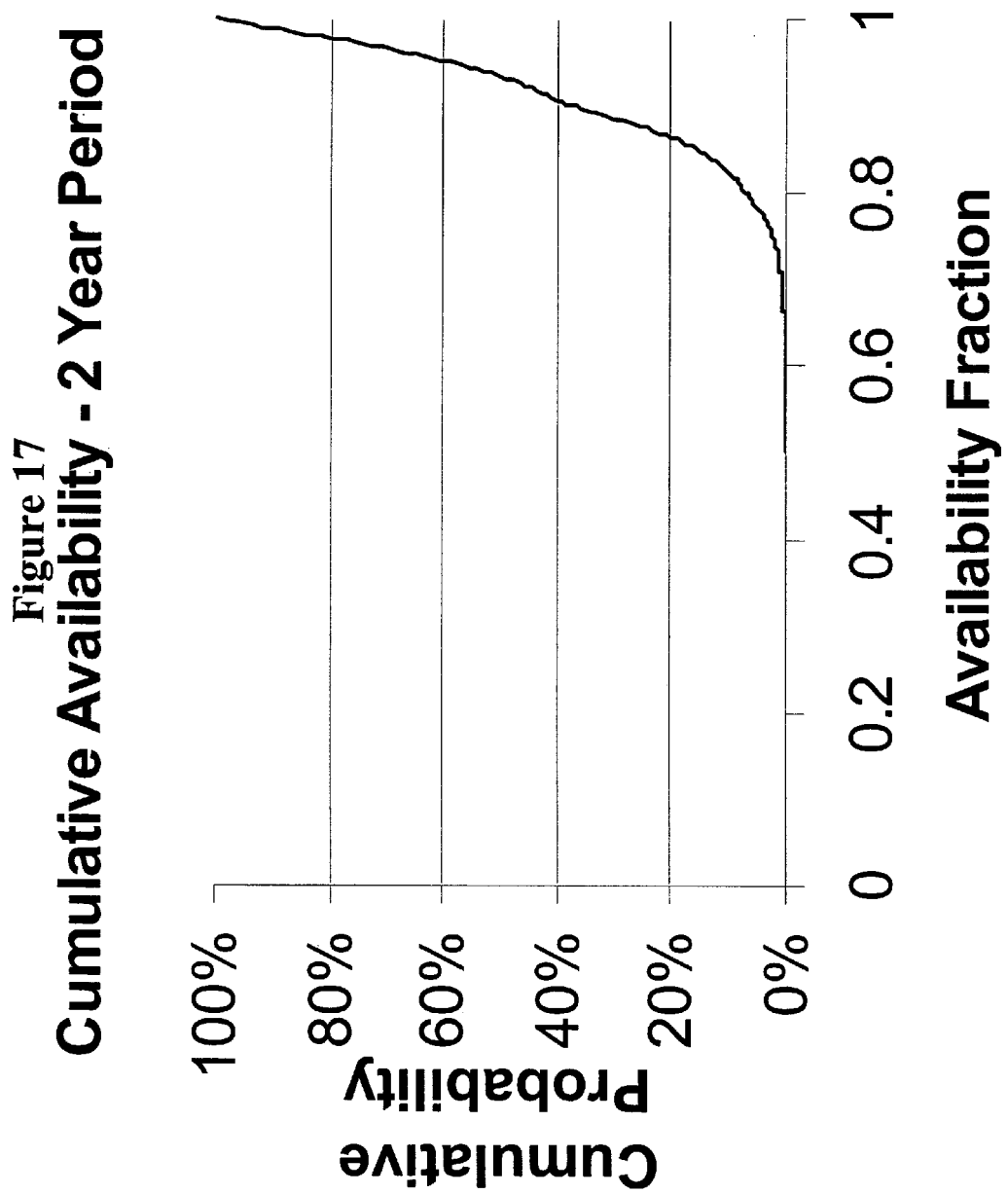
FIG. 17 is the availability distribution (as a cumulative probability) for a 30-minute time window for a 4000 MW system made up of 10 generating units of various capacities over a historical 2 year period.

FIG. 17 is the availability distribution for a 30-minute time window for a 4000 MW system made up of 10 generating units of various capacities over a historical 2 year period. Availability fractions for the system was obtained using the same procedure described for Table 12. The histogram of all STII (30-minute) availability fractions is shown in FIG. 17. In the special case of the STII being the time window of interest, simply forming a cumulative histogram of the availability values on the system time line results in the desired availability distribution.

In any availability calculation, either using cycles (TBF, TTR) or minimum time window, for forecasting and quantitative decision-making regarding future performance, it may be desirable to edit or modify the availability values along the time line prior to forming the distribution. Particular failures can be eliminated if the root cause of those failures has been corrected, or the associated TTF can be lengthened or shortened, or their restore times can be changed to reflect anticipated improvement or deterioration.

Use of the Availability Data

Economic information can be used in conjunction with the availability data for making management decisions. For instance, it may be necessary to associate a cost with the products. One example requiring a "product cost" association is that of electrical generating plant where the economic relationship between the quantity and cost of power sold under contract is compared to plant anticipated performance. By integrating economic information with availability information, the cost optimization associated with a prospective power contract can be examined, and the economic loss incurred from deviating from an optimum contract quantity can be forecast. For instance, in a particular power contract, if the quantity sold cannot be produced, then power must be purchased, typically at a premium resulting in a "loss." However, if the system is capable of generating more power than that sold, again, a "loss" results in that economic opportunity is foregone. Examination of the total economic "loss" from variation in system generation availability (either unavailable generating capacity or unused generating capacity) allows the economic optimum contract value to be identified.

Basic to this valuation is the process of collapsing the availability distribution below and above a particular availability or capacity value (the test value or assessment value). For any assessed or test value of availability or capacity, the probability and consequences of being below and above that value is determined. This assessment process is illustrated with a simple example of a die, shown in FIG. 20. As shown in FIG. 20, the known probability of each possible outcome of the die roll allows analysis for quantitative decisions. In this example, the decisions surround the target or goal of rolling at least a value of three. A roll with its outcome variability is analogous to the availability variability of a system over a particular time window. As each die face has a known probability of occurrence and value, each small bin of the histogram for availability has a known probability of occurrence and value. The die is known to return values of 1, 2, 3, 4, 5, and 6, each with a probability of occurrence of 1/6. The distribution, seen in Table A of FIG. 20, returns a "mean value" of 3.5. A value of 3 is to be assessed by way of example. This is analogous to the availability required to produce sales commitment.

A value less than 3 will result in a "shortfall," while a value in excess of 3 results in an "unsold excess." The method can explore both the probability of a shortfall and the expected magnitude of any shortfall (as well as an excess) The probability of a value less than 3 is 1/3 for any one roll, or $P(v<3)=1/3$. Thus, there is a one in three chance of obtaining a value below the test value. To obtain the expected value of below target performance, that portion of the original probability density located "below" the test value is scaled or normed to produce a true probability distribution (that is, find the multiplier "M" so that $(M*\Sigma p(v<3)=1.0)$). For instance, in the case of the die, the multiplier should be 3.0 applied to $p(v<3)$). This simply normalizes the probability data below the face value of 3 so that we can easily find the mean or expected value of the face values below 3.

From this new scaled probability distribution, the expected value is calculated (i.e. Σvalue(v)*Prob(value(v))). This process reduces the selected portion of the original probability density to a single value which is helpful for efficient quantitative decisions. For instance, with the test value of 3, the expected value of all values less than 3 is 1.5, or EV(v<3)=1.5. The "mean shortfall" is the difference between this expected value and the target, or {EV(v<3)−3}=−1.5. Hence, both the probability of a shortfall and the expected magnitude of the shortfall have been calculated; namely, there is a 33.3% probability of a shortfall and the size of the shortfall, when there is one, is 1.5 units on average. The likelihood of a shortage and a meaningful measure of the consequence of a shortage are now known. The calculations for shortfall are seen in Example 1 (left side). The complementary or overage (surplus) situation is seen in Example 1 (right side). Note that Example 1 also shows the calculation of a simultaneous mean shortfall and mean overage (excess) expectation. This is consistent with the fact that, for any sales commitment, within a reasonable range of values, both risks (and resultant consequence) of being too low and of being too high are simultaneously present. The risk may be either zero or certainty, but normally in practical application the risk is between these extremes, that is, most best business decisions involve some degree of each of the two types of risk.

For instance, using the availability distribution data of FIG. 17, an analysis can be made of a particular contract sale. FIG. 18 is a plot of the economic assessment of a range capacity assessment. Once a value has been assessed or tested using the distribution data of FIG. 17, the quantity of shortfall is multiplied by the cost of replacement power and the quantity of surplus (unsold excess) is multiplied by the value of an additional unit of sales. These costs due to system variation are shown in FIG. 18 over a reasonable range of contract sales volumes (sales volume is expressed as a percentage of generating capacity). Two curves are shown: (1) economic loss due to power "available but unsold"; and (2) the economic loss due to power "unavailable but sold." The third curve shown, the "total loss" curve, is the sum of the two cost curves. For purposes of the analysis shown in FIG. 18, the cost of $15/MW for power purchased due to unavailable system generation was use (replacement costs), and a cost of $11/MW was used for available but unsold power (the market cost). Obviously, the economic curves are functions of the costs. (FIG. 19 demonstrates that the cost curves and economic optimum is not only a function of the availability distribution but also the cost of replacement power and value of an additional unit of sales. The total variation cost curves for a number of "replacement power cost"/"value of sales lost" per MW are shown, such as $15/$12, $12/$15, etc.)

The procedure to evaluate the economic impact of choosing a particular "contract value" outlined above is as follows:

Capacity as a percent of maximum (at particular value $a$)=$Ca$=$a$/maximum;

for instance, a particular plant has a "maximum" production of 100000 MW (over a set period of interest) If a value of 90,000 MW is chosen to evaluate, the $C_{90000}$=90,000/100000=0.9

Probability of a Capacity as a percent of maximum for a particular value Ci occurring (P(Ci)) is estimated from the capacity histograms as follows:

$P(Ci)$≈(number of occurrences of $Ci$ in histogram)/ total occurrences of all capacities in histogram)

"Mean Value" of a "capacity as a percent of maximum" occurring which is less than Ca is $MV_{<Ca}=\Sigma_{Ci<Ca}Ci*P(Ci)*(1/\Sigma_{Ci<Ca}P(Ci))$ (this is similar to an expected value based upon re-norming the probabilities associated with values less than Ca, so that sum of these probabilities is 1.0)

Mean Shortfall=$Ca-MV_{<Ca}=Ca-\Sigma_{Ci<Ca}Ci*P(Ci)*(1/\Sigma_{Ci<Ca}P(Ci))$

Expected Value of Mean Shortfall=(Mean Shortfall*$\Sigma_{Ci<Ca}P(Ci)$)

Economic Value of Expected Value of Mean Shortfall=(Expected Value of Mean Shortfall)*(replacement unit cost)  (A)

(there is an assumption in the in assigning an economic loss to shortages, that assumption being that the shortage must be replaced with purchases on the market)

Similarly, the economic value of "overages" instead of losses can be estimated as Mean Value of a "capacity as a percent of maximum" occurring which is greater than or equal to Ca is $MV_{\geq Ca}=\Sigma_{Ci\geq Ca}Ci*P(Ci)*(1/\Sigma_{Ci\geq Ca}P(Ci))$ Mean Overage=$MV_{\geq Ca}-Ca=\Sigma_{Ci\geq Ca}Ci*P(Ci)*(1/\Sigma_{Ci\geq Ca}P(Ci))-Ca$ Expected Value of Mean Overage=(Mean Overage*$\Sigma_{Ci\geq Ca}P(Ci)$)

Economic Value of Expected Value of Mean Overage=(Expected Value of Mean Overage)*(incremental profit contribution)  (B)

Where incremental profit contribution is the value that the overage could be sold for, either under another contract or on the market Total economic impact "loss" caused by capacity variability at a particular Ca=(A)+(B)

Other means of evaluating particular plant risks, business, technical or economic issues are possible using similar methodology. For instance, only (A) or (B) could be considered, or simply the probability of not achieving a particular capacity may wish to be examined.

These economic costs are the cost associated with variation in availability. Obviously, if the plant was to operate continuously at the average availability for the system with no deviation, these costs would be not materialize as the system was completely predictable and hence, we would always know the precise amount of power to sell. Because there is variation, this method measures and uses data associated with the variation to optimize the business decision. This just described application is only one of various applications to power plants and other plants and systems providing goods and services.

TABLE 11

| Date/Time | Net MW | Availability net basis | Threshold MW | Rated or Maximum MW |
|---|---|---|---|---|
| Dec. 17, 1999 0:30 | 379.4 | 1.000 | 300 | 400 |
| Dec. 17, 1999 1:00 | 378.2 | 1.000 | 300 | |
| Dec. 17, 1999 1:30 | 379.1 | 1.000 | 300 | |
| Dec. 17, 1999 2:00 | 379.4 | 1.000 | 300 | |
| Dec. 17, 1999 2:30 | 379.2 | 1.000 | 300 | |
| Dec. 17, 1999 3:00 | 379.5 | 1.000 | 300 | |
| Dec. 17, 1999 3:30 | 379.6 | 1.000 | 300 | |
| Dec. 17, 1999 4:00 | 379.2 | 1.000 | 300 | |
| Dec. 17, 1999 4:30 | 379.2 | 1.000 | 300 | |
| Dec. 17, 1999 5:00 | 379.5 | 1.000 | 300 | |
| Dec. 17, 1999 5:30 | 378.9 | 1.000 | 300 | |
| Dec. 17, 1999 6:00 | 378.6 | 1.000 | 300 | |
| Dec. 17, 1999 6:30 | 378.6 | 1.000 | 300 | |
| Dec. 17, 1999 7:00 | 377.9 | 1.000 | 300 | |
| Dec. 17, 1999 7:30 | 378.8 | 1.000 | 300 | |
| Dec. 17, 1999 8:00 | 379.1 | 1.000 | 300 | |
| Dec. 17, 1999 8:30 | 378.9 | 1.000 | 300 | |
| Dec. 17, 1999 9:00 | 378.7 | 1.000 | 300 | |
| Dec. 17, 1999 9:30 | 378.5 | 1.000 | 300 | |
| Dec. 17, 1999 10:00 | 378.7 | 1.000 | 300 | |
| Dec. 17, 1999 10:30 | 378.8 | 1.000 | 300 | |
| Dec. 17, 1999 11:00 | 319.6 | 1.000 | 300 | |
| Dec. 17, 1999 11:30 | 202.0 | 0.505 | 300 | |
| Dec. 17, 1999 12:00 | 126.8 | 0.317 | 300 | |
| Dec. 17, 1999 12:30 | 61.6 | 0.154 | 300 | |
| Dec. 17, 1999 13:00 | 54.1 | 0.135 | 300 | |
| Dec. 17, 1999 13:30 | 52.1 | 0.130 | 300 | |
| Dec. 17, 1999 14:00 | 18.0 | 0.045 | 300 | |
| Dec. 17, 1999 14:30 | 0.0 | 0.000 | 300 | |
| Dec. 17, 1999 15:00 | 0.0 | 0.000 | 300 | |
| Dec. 17, 1999 15:30 | 0.0 | 0.000 | 300 | |
| Dec. 17, 1999 16:00 | 0.0 | 0.000 | 300 | |

TABLE 12

Developing an Availability Time Line for a System of Multiple Generating Units

| Time Line | Unit 1 (400 MW) | | Unit 2 (200 MW) | | Unit 3 (300 MW) | | Unit 4 (400 MW) | | System (1300) MW |
|---|---|---|---|---|---|---|---|---|---|
| Interval Number | Unit Avail | Weighted Avail | Unit Avail | Weighted Avail | Unit Avail | Weighted Avail | Unit Avail | Weighted Avail | System Availability |
| 1 | 1 | .30769 | 1 | .15385 | 0 | 0 | 1 | .30769 | .76923 |
| 2 | 1 | .30769 | .9 | .13846 | 0 | 0 | 1 | .30769 | .75384 |
| 3 | 1 | .30769 | .9 | .13846 | 0 | 0 | 1 | .30769 | .75384 |
| 4 | 1 | .30769 | .7 | .10769 | 0 | 0 | 1 | .30769 | .72307 |
| 5 | 1 | .30769 | .7 | .10769 | 0 | 0 | 1 | .30769 | .72307 |
| 6 | 1 | .30769 | .7 | .10769 | 0 | 0 | 1 | .30769 | .72307 |
| 7 | 1 | .30769 | .7 | .10769 | 0 | 0 | 1 | .30769 | .72307 |
| 8 | 1 | .30769 | .7 | .10769 | 0 | 0 | 1 | .30769 | .72307 |

Although particular aspects of the invention have been described herein with a certain degree of particularity, it should be understood that the present disclosure is made only by way of example and that numerous departures from the particular examples disclosed may be made without departing from the spirit and scope of this invention which are to be determined from the following claims.

I claim:

1. A method to determine the probability of the capacity of a plant over a time window of interest, said time window having a time length P, where P equals a multiple of the shortest time interval of interest (STII), said probability exceeding a desired value or failing to meet a desired value is determined, said method comprising the steps of:

(a) assembling said plant's historical production data over a selected time L so that said historical data represents plant production at STII intervals (b) for each said STII interval, calculating the availability fraction;

(c) calculating the availability or capacity (Ci) from said availability fractions for each contiguous portion of length P of said selected time L, where "i" is an index representing the number of contiguous P length portions contained in said selected length L;

(d) creating a histogram or probability distribution data set from said availabilities or capacities Ci;

(e) from said histogram or probability distribution data set, calculate the probability of the capacity of said plant either exceeding a desired value or failing to meet a desired value;

(f) outputting said probability of the capacity of said plant either exceeding a desired value or failing to meet a desired value.

2. The method according to claim 1 wherein said step of assembling said plant data further includes the step of editing said plant data.

3. The method according to claim 2 wherein said editing uses a threshold means to identify said plant data reflecting production reduction for causes other than plant failure.

4. The method according to claim 3 wherein said threshold means includes the step of replacing said identified plant data reflecting production reduction for causes other than plant failure with new values.

5. The method of claim 1 wherein said calculated probability of the capacity of said plant either exceeding a desired value or failing to meet a desired value is used to evaluate risk.

6. A computer readable medium having encoded thereon executable instructions for the method of claim 1.

* * * * *